United States Patent
Vorabbi et al.

(10) Patent No.: US 10,078,774 B1
(45) Date of Patent: Sep. 18, 2018

(54) SIMD-BASED SYSTEM FOR MULTIPLE DECODE OF CAPTURED IMAGES

(71) Applicant: Datalogic IP Tech S.r.l., Bologna (IT)

(72) Inventors: Lorenzo Vorabbi, Rimini (IT); Stefano Santi, Eugene, OR (US)

(73) Assignee: Datalogic IP Tech S.R.L., Bologna (IT)

( * ) Notice: Subject to any disclaimer, the term of this patent is extended or adjusted under 35 U.S.C. 154(b) by 0 days.

(21) Appl. No.: 15/686,671

(22) Filed: Aug. 25, 2017

(51) Int. Cl.
*G06K 7/10* (2006.01)
*G06K 7/14* (2006.01)

(52) U.S. Cl.
CPC ......... *G06K 7/1443* (2013.01); *G06K 7/1413* (2013.01); *G06K 7/1417* (2013.01); *G06K 7/1447* (2013.01); *G06K 7/1456* (2013.01)

(58) Field of Classification Search
CPC .. G06K 7/10; G06K 9/18; G06K 5/04; G06K 9/32; G06K 9/36; G08C 21/00; G06F 17/00
USPC ....... 235/462.09, 462.07, 462.1, 462.11, 375
See application file for complete search history.

(56) References Cited

U.S. PATENT DOCUMENTS

| | | | |
|---|---|---|---|
| 9,189,670 B2 | 11/2015 | Moed et al. | |
| 9,542,732 B2 | 1/2017 | Bogan | |
| 2002/0122564 A1* | 9/2002 | Rhoads | G01C 11/00 382/100 |

* cited by examiner

*Primary Examiner* — Edwyn Labaze
(74) *Attorney, Agent, or Firm* — The Juhasz Law Firm

(57) ABSTRACT

A decoding device may include a processor that may include a core component configured to: analyze watermark metadata to identify a watermark ROI from among multiple candidate ROIs in response to generation of the watermark metadata, determine whether rectification is to be performed within the watermark ROI, perform watermark decoding with the rectified watermark ROI data to decode data encoded within a digital watermark within the rectified watermark ROI in response to performance of the rectification, and transmit the data to a server via a network in response to successful decode of the data. The processor may also include a SIMD component configured to perform at least one of: a watermark transform with the captured image to generate the watermark metadata, and the rectification within the watermark ROI to generate the rectified watermark ROI data in response to the determination by the core component to perform the rectification.

29 Claims, 19 Drawing Sheets

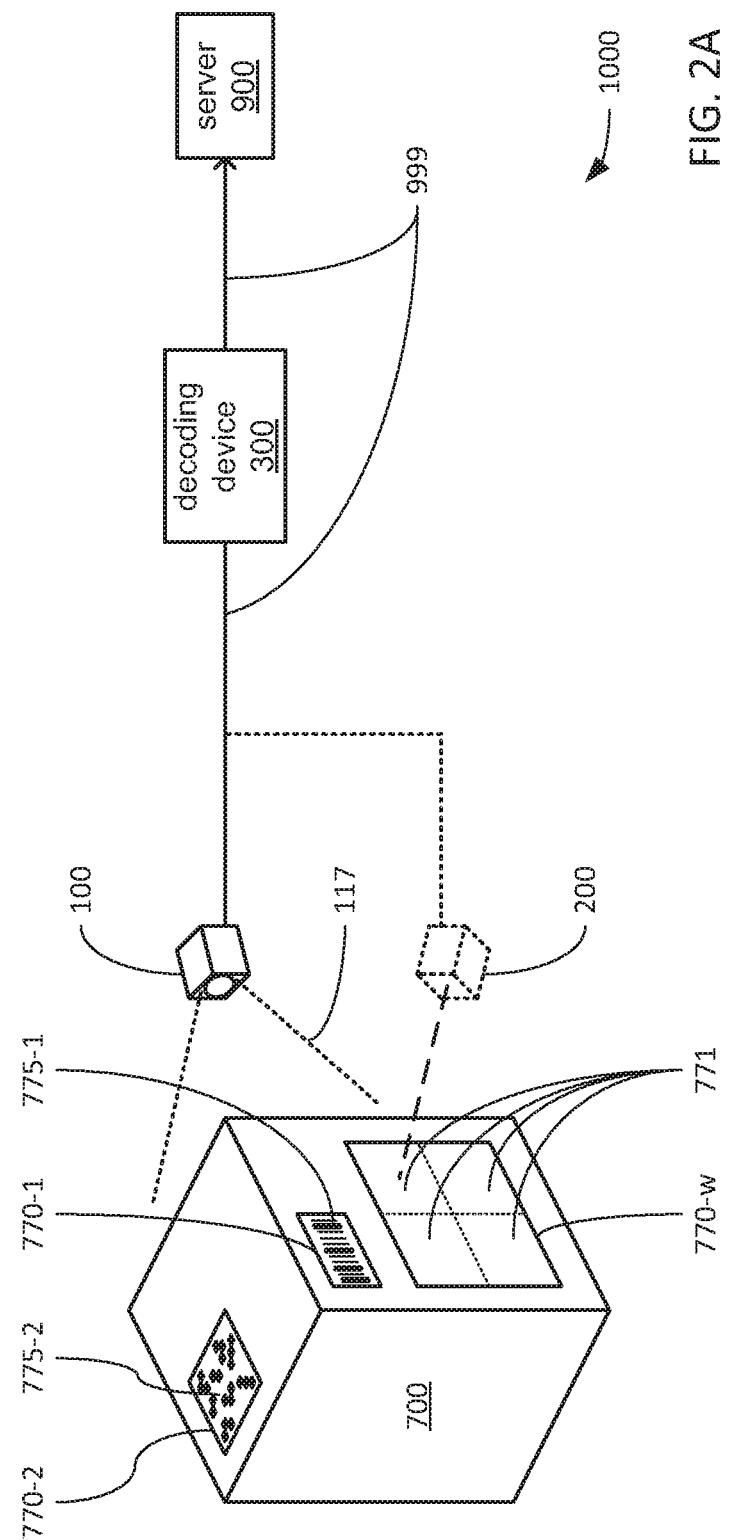

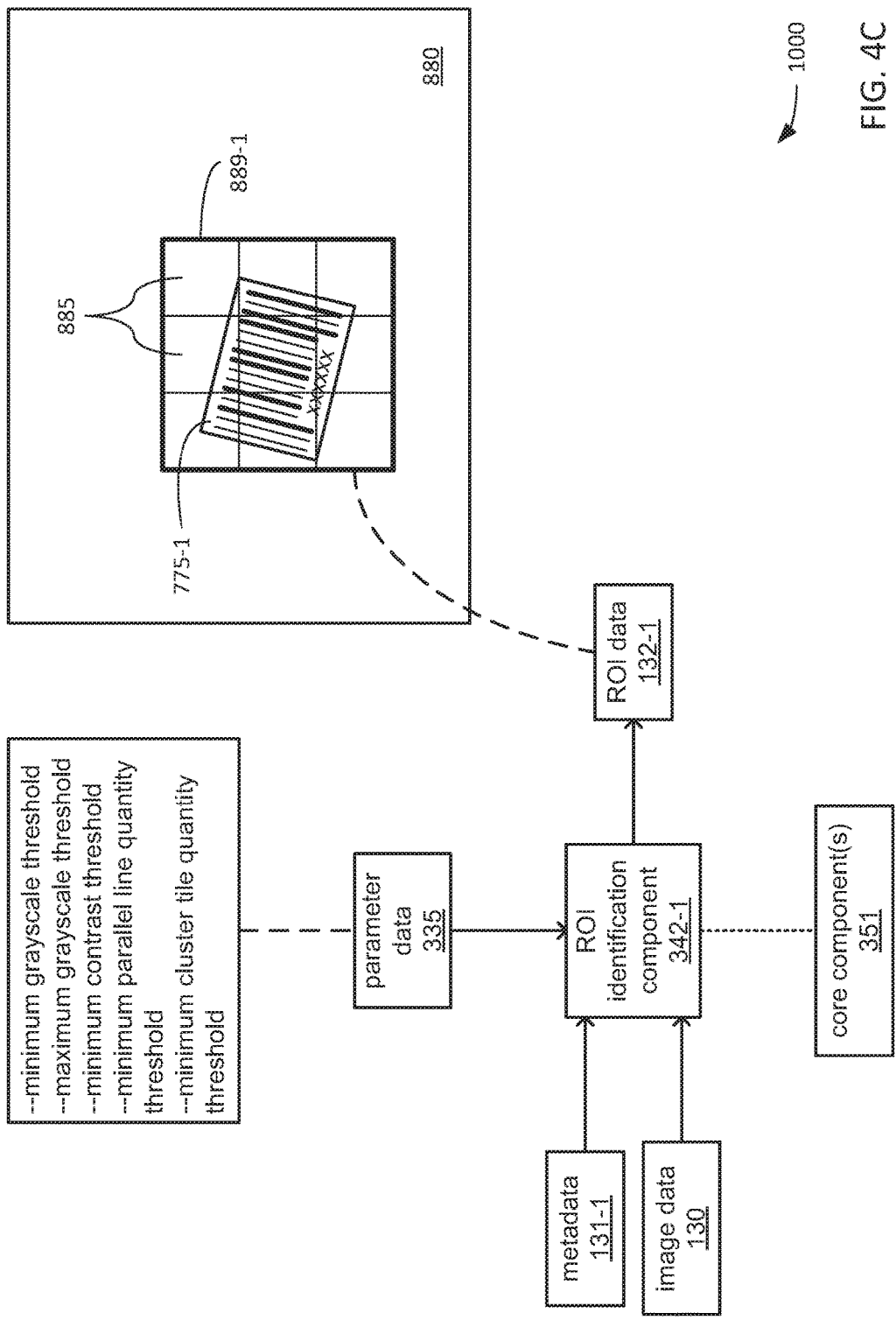

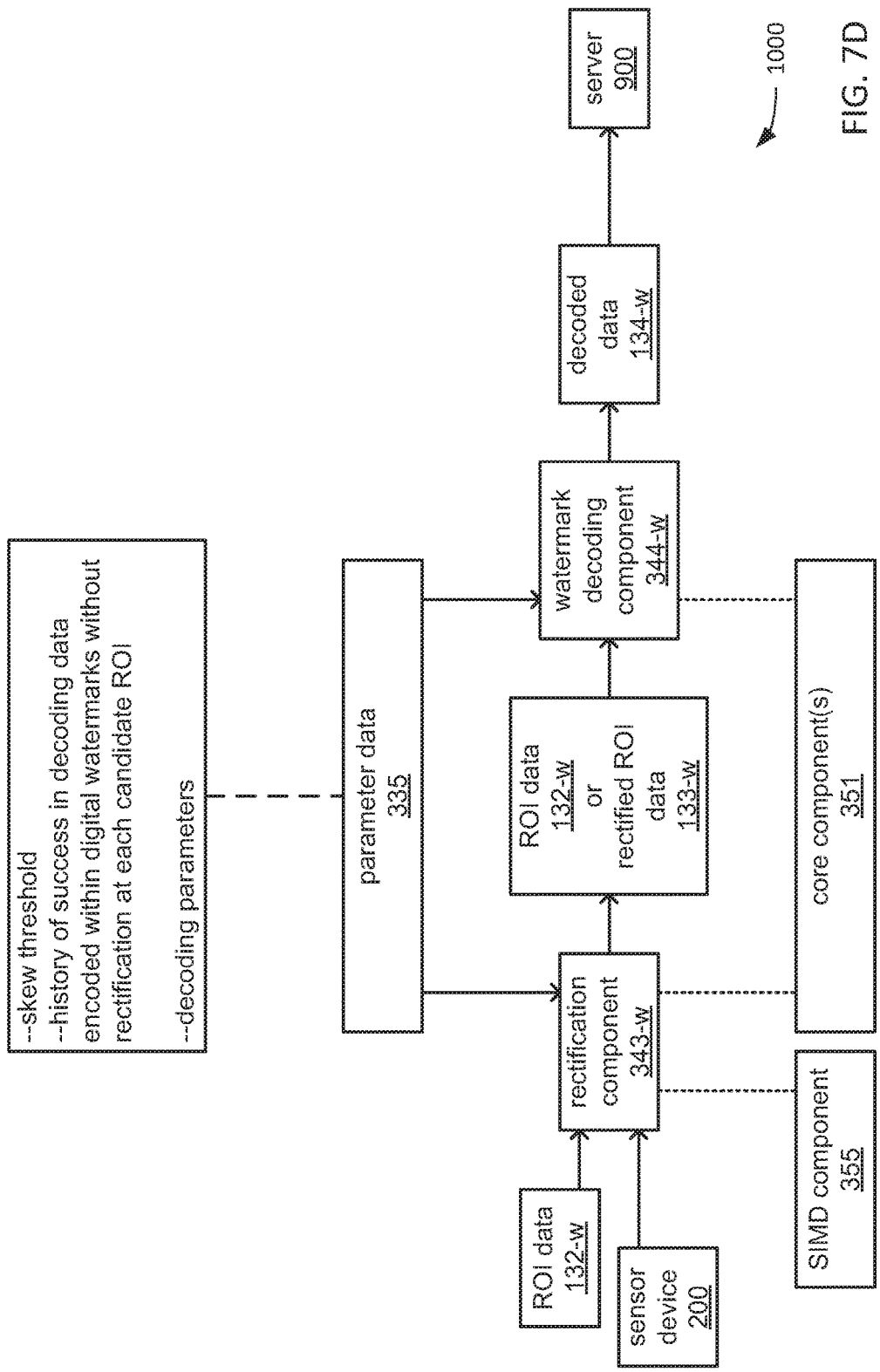

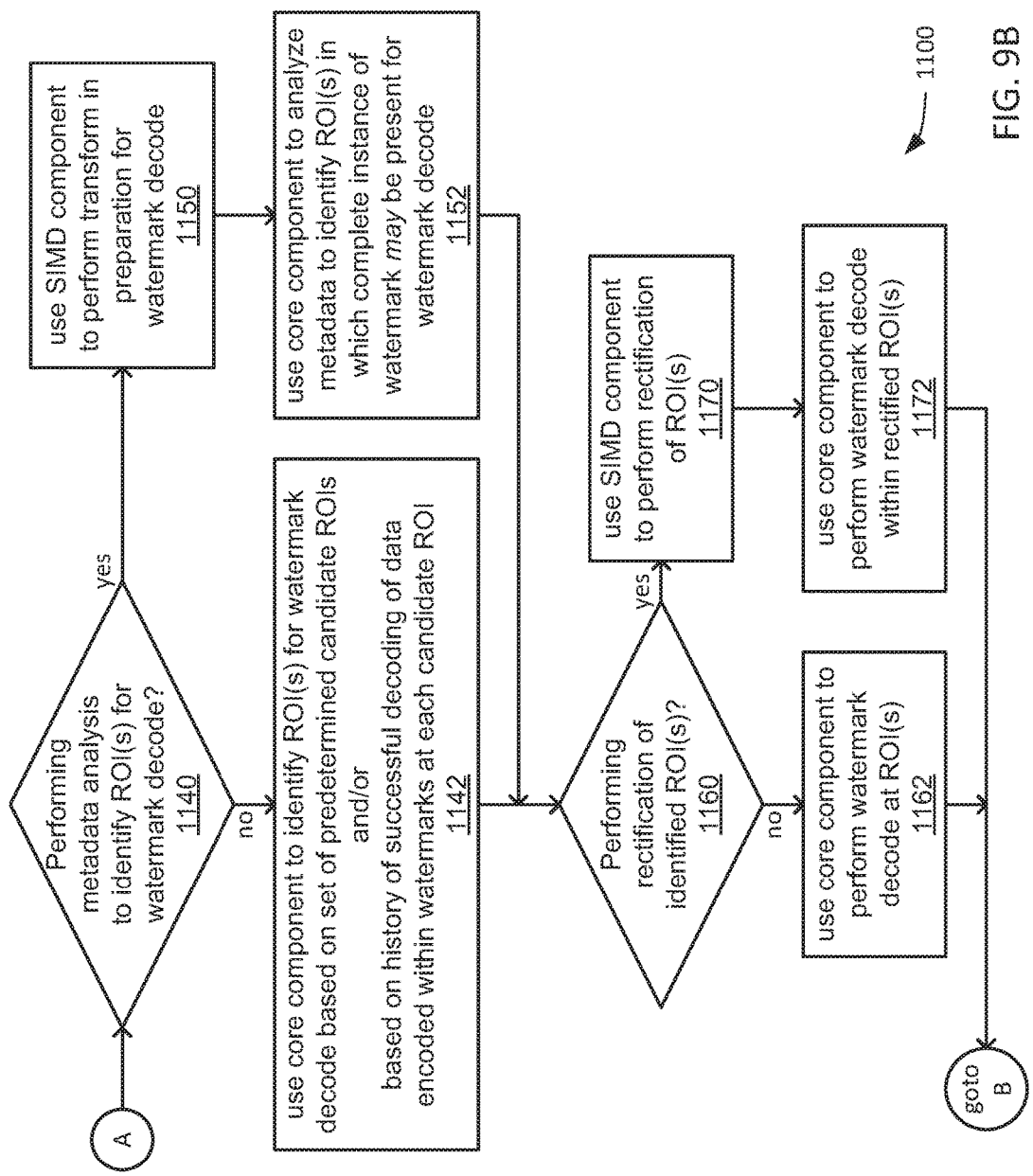

SIMD-BASED SYSTEM FOR MULTIPLE DECODE OF CAPTURED IMAGES

RELATED APPLICATIONS

This application is related to the following applications, the contents of which are hereby incorporated by reference in their entirety: Application Ser. No. 15/686,614, entitled "CODED IMAGE CAPTURE AND DECODING SYSTEM," filed concurrently herewith by Stefano Santi and Lorenzo Vorabbi.

BACKGROUND OF THE INVENTION

1. Field of the Invention

The present invention relates to systems for use of single-instruction multiple-data (SIMD) processing in multiple decode of indicia and/or watermarks that encode data.

2. Description of the Related Art

The application of an indicia or a digital watermark to a surface of an object for subsequent capture and decoding to retrieve data encoded therein is well known. Also well known is the use of a camera to capture an image of such a surface in an effort to capture an image of such an indicia or digital watermark for decoding.

Such a camera may be a stationary camera positioned to cover a location at which an object bearing such an indicia or digital watermark may be placed and/or through which such an object may be transported. By way of example, such a camera may be positioned to place a doorway or portion of the interior of a warehouse within its field of view (FOV) to enable the capture of an indicia or digital watermark carried on a surface of an object (e.g., a box, a crate, a palletized load, etc.) as the object is transported into the warehouse, is stored within the portion of the warehouse, and/or is transported out of the warehouse.

As will be familiar to those skilled in the art, searching through a captured image to identify such an indicia or digital watermark, and then interpreting such an indicia or digital watermark to decode the data encoded therein are typically processing-intensive tasks. In particular, the processing demands of searching through a captured image to identify an indicia or watermark are sufficiently great that the use of specialized circuitry implemented within an application-specific integrated circuit (ASIC) or field-programmable gate array (FPGA), in addition to a processor, to offload such work from the processor has been considered.

However, pairing such additional circuitry with a processor typically adds considerable undesired expense and complexity to decoding devices, and/or typically undesirably increases the power consumption of decoding devices. Further, as increased use of indicia and/or digital watermarking results in increasingly frequent instances of objects carrying multiple ones of indicia and/or digital watermarks, such additional circuitry often lacks the flexibility that is increasingly needed to perform searches and/or decodes of differing combinations of indicia and/or digital watermark that may be present on surface(s) of an object, and therefore, within a captured image.

Thus, a system able to more efficiently perform searches and/or decodes of differing indicia and/or digital watermarks, or differing combinations thereof, is needed.

SUMMARY OF THE INVENTION

Technologies are described for making more efficient use of processing resources in identifying and interpreting differing indicia and/or digital watermarks within an image of at least a portion of an object captured by a camera without augmentation of a processor with external specialized circuitry to offload processing operations from the processor.

A decoding device may include a storage configured to store image data, and at least one of rectified watermark region of interest (ROI) data and watermark metadata, wherein: the image data includes grayscale values of pixels of an image captured by an image sensor of a camera of a portion of an object, the rectified watermark ROI data includes grayscale values of pixels of a rectified image of a watermark ROI within the captured image, and the watermark metadata may include a map of metadata values indicative of at least a watermark characteristic of the grayscale values of tiles of the pixels of the captured image. The decoding device may also include a processor coupled to the storage, and the processor may include a core component configured to: in response to generation of the watermark metadata, analyze the watermark metadata to identify the watermark ROI from among a set of candidate ROIs that each encompass a different portion of the captured image; determine whether rectification is to be performed with the grayscale values of the pixels within the watermark ROI to generate the rectified watermark ROI data; in response to performance of the rectification, perform watermark decoding with the rectified watermark ROI data to attempt a decode of watermark-encoded data encoded within a digital watermark within the rectified image of the watermark ROI; and in response to a successful decode of the watermark-encoded data, transmit the watermark-encoded data to a server via a network. The processor may also include a single-instruction multiple-data (SIMD) component configured to perform at least one of: a watermark transform with the grayscale values of the pixels of the captured image to generate the watermark metadata in preparation for the analysis of the watermark metadata by the core component; and the rectification with the grayscale values of the pixels within the watermark ROI to generate the rectified watermark ROI data in response to the determination by the core component to perform the rectification.

A decoding system may include a camera that includes an image sensor configured to capture an image of a portion of an object, wherein the captured image is output by the camera as a bitstream of image data that may include grayscale values of pixels in a two-dimensional (2D) array of pixels of the captured image. The decoding system may also include a processor that includes a core component configured to: in response to generation of watermark metadata, analyze the watermark metadata to identify a watermark region of interest (ROI) within the captured image from among a set of candidate ROIs that each encompass a different portion of the captured image, wherein the watermark metadata may include a map of metadata values indicative of at least a watermark characteristic of the grayscale values of tiles of the pixels of the captured image; determine whether rectification is to be performed with the grayscale values of the pixels within the watermark ROI to generate a rectified watermark ROI data, wherein the rectified watermark ROI data may include grayscale values of pixels of a rectified image of the watermark ROI; in response to performance of the rectification, perform watermark decoding with the rectified watermark ROI data to attempt a decode of watermark-encoded data encoded within a digital watermark within the rectified image of the watermark ROI; and in response to a successful decode of the watermark-encoded data, transmit the watermark-encoded data to a server via a network. The processor may also include a single-instruction multiple-data (SIMD) component configured to perform at least one of: a watermark transform with the grayscale values of the pixels of the captured image to generate the watermark metadata in preparation for the analysis of the watermark metadata by the core component; and the rectification with the grayscale values of the pixels within the watermark ROI to generate the rectified watermark ROI data in response to the determination by the core component to perform the rectification.

A decoding device may include a storage configured to store image data and indicia metadata, wherein: the image data may include grayscale values of pixels of an image captured by an image sensor of a camera of a portion of an object; the captured image is divided into a plurality of tiles; each tile of the plurality of tiles may include a two-dimensional (2D) array of pixels of a portion of the captured image; and the indicia metadata may include a map of metadata values indicative of at least an indicia characteristic of the grayscale values of the pixels within each tile. The decoding device may also include a processor coupled to the storage, and the processor may include a core component configured to: analyze the indicia metadata to identify an indicia ROI within the captured image that includes an indicia that encodes a indicia-encoded data; and in response to identification of the indicia ROI within the captured image, interpret the indicia to decode the indicia-encoded data, and transmit the indicia-encoded data to a server via a network. The processor may also include a single-instruction multiple-data (SIMD) component configured to perform an indicia transform with the grayscale values of the pixels of the captured image to generate the indicia metadata in preparation for the analysis of the indicia metadata by the core component.

BRIEF DESCRIPTION OF THE DRAWINGS

FIGS. 2A and 2B, together, show aspects of an example use of an example implementation of the system of FIG. 1.

FIGS. 4A, 4B, 4C and 4D, together, show aspects of identifying and decoding a 1D indicia in a captured image.

FIGS. 7A, 7B, 7C and 7D, together, show aspects of identifying and decoding a digital watermark in a captured image.

FIGS. 9A and 9B, together, show aspects of the operation of an implementation of the system of FIG. 1.

DETAILED DESCRIPTION OF THE INVENTION

Figure 1:
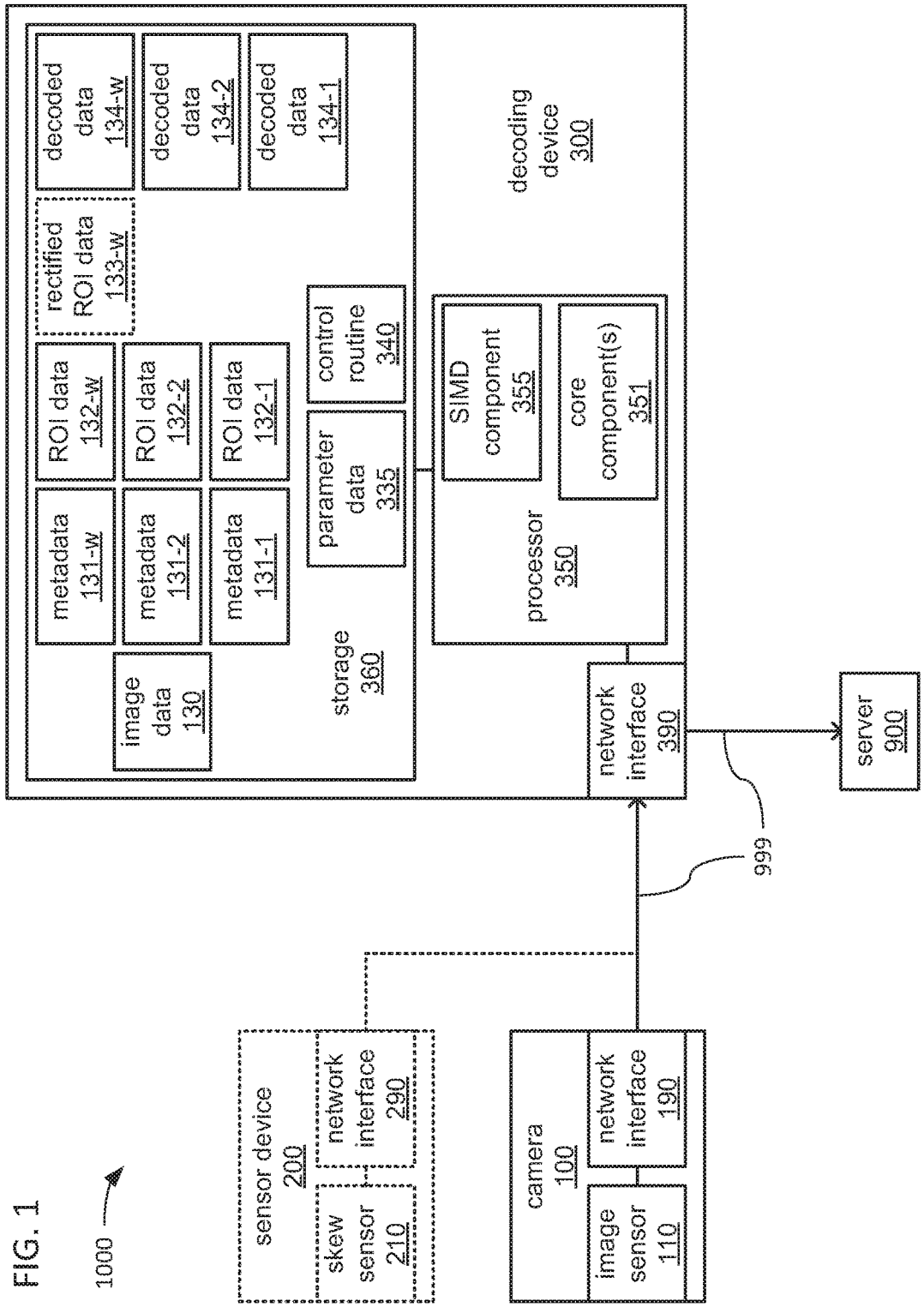
FIG. 1 shows aspects of an implementation of a decoding system.

This detailed disclosure further incorporates by reference the disclosure provided in application Ser. No. 15/686,614 entitled "CODED IMAGE CAPTURE AND DECODING SYSTEM" filed concurrently herewith by Stefano Santi and Lorenzo Vorabbi.

In the following detailed description, reference is made to the accompanying drawings that form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Disclosed herein is a decoding system to identify and decode one or more indicia and/or digital watermarks that encode data, and that are included within an image of at least a portion of an object captured by a camera. Generally, the indicia decoding system may include a camera configured to capture an image of a portion of an object. The decoding system may also include a processor that includes a core component configured to analyze watermark metadata to identify a watermark region of interest (ROI) within the captured image, determine whether rectification is to be performed with the grayscale values of the pixels within the watermark ROI, perform watermark decoding with the rectified watermark ROI data to attempt a decode of watermark-encoded data encoded within a digital watermark within a rectified image of the watermark ROI, and/or transmit the watermark-encoded data to a server via a network. The processor may also include a SIMD component configured to perform at least one of: a watermark transform with the grayscale values of the pixels of the captured image to generate the watermark metadata, and the rectification with the grayscale values of the pixels within the watermark ROI.

The decoding device may include storage configured to store image data, and at least one of rectified watermark ROI data and watermark metadata. The decoding device may also include a processor coupled to the storage, and including a core component configured to: analyze the watermark metadata to identify the watermark ROI from among a set of candidate ROIs; determine whether rectification is to be performed with the grayscale values of the pixels within the watermark ROI; perform watermark decoding with a rectified watermark ROI data to attempt a decode of watermark-encoded data encoded within a digital watermark within the rectified image of the watermark ROI; and/or transmit the watermark-encoded data to a server via a network. The decoding device may also include a SIMD component configured to perform at least one of: a watermark transform with the grayscale values of the pixels of the captured image to generate the watermark metadata; and the rectification with the grayscale values of the pixels within the watermark ROI.

Alternatively, the decoding device may include a storage configured to store image data and indicia metadata. The decoding device may also include a processor coupled to the storage, and including a core component configured to: analyze the indicia metadata to identify an indicia ROI within the captured image that includes an indicia that encodes a indicia-encoded data; and in response to identification of the indicia ROI within the captured image, interpret the indicia to decode the indicia-encoded data, and transmit the indicia-encoded data to a server via a network. The decoding device may also include a single-instruction multiple-data (SIMD) component configured to perform an indicia transform with the grayscale values of the pixels of the captured image to generate the indicia metadata in preparation for the analysis of the indicia metadata by the core component.

FIG. 1 depicts aspects of an example embodiment of a decoding system 1000 that may include a camera 100, a sensor device 200 and/or a decoding device 300 coupled by a network 999 (e.g., the cable-based and/or wireless links interconnecting devices). In the decoding system 1000 depicted in FIG. 1, and as will be explained in greater detail, the camera 100, the sensor device 200 and/or the decoding device 300 may cooperate through the network 999 to capture and decode images of indicia and/or digital watermarks encoding data that are carried on surface(s) of objects. Following such decoding, the decoding device 300 may further transmit the decoded data to another device, such as the depicted example server 900.

The camera 100 may include an image sensor 110 and a network interface 190 to couple the camera 100 to the network 999. Within the camera 100, the image sensor 110 and the network interface 190 may be communicatively coupled to exchange data therebetween through the exchange of electrical, optical, magnetic and/or other signals through one or more buses and/or other form of interconnect. The image sensor 110 may capture an image within its field of view and provide the captured image to the network interface 190 to transmit to the decoding device 300 via the network 999.

The sensor device 200, if present, may include a skew sensor 210 and a network interface 290 to couple the sensor device 200 to the network 999. Within the sensor device 200, the skew sensor 210 and the network interface 290 may be communicatively coupled to exchange data therebetween through the exchange of electrical, optical, magnetic and/or other signals through one or more buses and/or other form of interconnect. The skew sensor 210 may detect a degree of skew between the plane of a surface of an object carrying indicia and/or a digital watermark and the plane of the images captured by the image sensor 110. The skew sensor 210 may provide an indication of the detected degree of skew to the network interface 290 to transmit to the decoding device 300 via the network 999.

The decoding device 300 may include a processor 350, a storage 360 and a network interface 390 to couple the decoding device 300 to the network 999. The processor 350 may incorporate one or more core components 351 and a single-instruction multiple-data (SIMD) component 355. The storage 360 may store image data 130; one or more of metadata 131-1, 131-2 and 131-w; one or more of ROI data 132-1, 132-2 and 132-w; rectified ROI data 133-w; one or more of decoded data 134-1, 134-2 and 134-w; parameter data 335 and a control routine 340. Within the decoding device 300, the storage 360 and the network interface 390 may each be communicatively coupled to the processor 350 to exchange data therewith through the exchange of electrical, optical, magnetic and/or other signals through one or more buses and/or other form of interconnect.

The control routine 340 may incorporate a sequence of instructions operative on the processor 350 to implement logic to perform various functions. In so doing, and as will be explained in greater detail, different ones of the one or more core components 351 and/or the SIMD component 355 of the processor 350 may perform different ones of the various functions at different times and/or in parallel. The SIMD component 355 and the one or more core components 351 may employ different processing architectures supporting different instruction sets to perform different operations. Each of the one or more core components 351 may support a larger and more complex instruction set than the SIMD component 355, and therefore, may support a wider range of operations with a relatively limited number of operands, which may include a wider range of branching instructions. In contrast, the SIMD component 355 may support a smaller and less complex instruction set than the one or more core components 351, and therefore, may support the performance of a narrower range of operations that are performed simultaneously with sets of multiple operands supported in side-by-side lanes of SIMD registers. However, the SIMD component 355 may not support branching instructions. In executing instructions, the operation and use of the SIMD component 355 may be controlled by the one or more core components 351.

A core component 351 of the processor 350 may access the storage 360 to retrieve the instructions of the control routine 340 for execution by the processor 350. In so doing, the processor 350 may be caused to operate the network interface 390 to receive a stream of data bits from the camera 100 conveying an image captured by the image sensor 110 of the camera, and may operate the storage 360 to store the received data bits of the captured image as the image data 130.

As will be explained in greater detail, in different embodiments and/or at different times, the processor 350 may be used to identify and decode one or more of an one-dimensional (1D) indicia (e.g., a barcode), a two-dimensional (2D) indicia, and a digital watermark that may be carried on a surface of an object, a portion of which may be included in the image captured by the image sensor 110 of the camera 100, and stored as the image data 130. The selection of which one(s) of a 1D indicia, a 2D indicia and a digital watermark are to be identified and decoded may be based on conditions associated with each individual installation of an embodiment of the decoding system 1000, including what form(s) of indicia and/or digital watermarks are desired to be decoded. By way of example, the decoding of a combination of 2D indicia and digital watermarks may be desired for an installation at a particular warehouse location, while in contrast, the decoding of a combination of 1D indicia and digital watermarks may be desired for an installation at a checkout counter at a retail store location. For sake of clarity and ease of understanding, throughout the text and figures of this application, data structures and executable instructions associated with 1D indicia are given reference numerals that include a "-1" suffix; data structures and executable instructions associated with 2D indicia are given reference numerals that include a "-2" suffix; and data structures and executable instructions associated with digital watermarks are given reference numerals that include a "-w" suffix.

Thus, depending on which of 1D indicia, 2D indicia and digital watermarks are to be decoded, the SIMD component 355 may be caused to perform one or more transforms with grayscale values of the pixels of the captured image stored as the image data 130 to derive the metadata 131-1, 131-2 and/or 131-w. More precisely, in embodiments where a 1D indicia is to be decoded, the SIMD component 355 may be caused to perform one or more transforms with the image data 130 to derive the metadata 131-1; in embodiments where a 2D indicia is to be decoded, the SIMD component 355 may be caused to perform one or more transforms with the image data 130 to derive the metadata 131-2; and in embodiments where a digital watermark is to be decoded, the SIMD component 355 may be caused to perform one or more transforms with the image data 130 to derive the metadata 131-w.

A core component 351 of the processor 350 may then be caused to analyze the metadata 131-1, 131-2 and/or 131-*w* to identify at least one region of interest (ROI) for each of a 1D indicia, a 2D indicia and/or a digital watermark, respectively, to be decoded. Where a 1D indicia is to be decoded, if a ROI within which a 1D indicia may be present is identified, then the core component 351 may retrieve the corresponding portion of the captured image, and may store that portion as the ROI data 132-1. Correspondingly, where a 2D indicia is to be decoded, if a ROI within which a 2D indicia may be present is identified, then the corresponding portion of the captured image may be retrieved, and may be stored as the ROI data 132-2. And correspondingly, where a digital watermark is to be decoded, if a ROI within which a digital watermark may be present is identified, then the corresponding portion of the captured image may be retrieved, and may be stored as the ROI data 132-*w*. As will be explained in greater detail, the manner in which the ROI of a digital watermark may be identified may differ from the manner in which the ROI of either a 1D indicia or a 2D indicia may be identified.

In embodiments in which a digital watermark is to be decoded, the SIMD component 355 may perform homography with the portion of the captured image that is within the ROI (and which may be stored as the ROI data 132-*w*) to derive a rectified image of the ROI (i.e., a "rectified ROI") in which the skew between the surface of an object carrying the digital watermark and the plane of the portion of captured image within the ROI is eliminated (or at least reduced). In some embodiments, it may be that the decoding of a digital watermark may be less tolerant of such skew than the decoding of either of a 1D indicia or of a 2D indicia. However, it should be noted that, although the use homography to perform rectification is discussed herein as employed in preparation for the decoding of a digital watermark, other embodiments are possible in which homography may, alternatively or additionally, be employed to generate rectified ROI(s) in preparation for the decoding of a 1D indicia and/or a 2D indicia.

Following at least the identification of a ROI for one or more of a 1D indicia, a 2D indicia and a digital watermark, and/or following a performance of homography with one or more of such ROIs, a core component 351 of the processor 350 may then attempt to interpret one or more of a 1D indicia, a 2D indicia and/or a digital watermark that may be present within a corresponding one or more ROIs. Where such interpretation is successful, data encoded within a 1D indicia, a 2D indicia and/or a digital watermark may be decoded, and the core component 351 may then operate the network interface 390 to transmit such decoded data to another device (e.g., the depicted server 900) via the network 999.

Still referring to FIG. 1, the image sensor 110 may be based on any of a variety of technologies and may employ any of a variety of optical scanning and/or other image capturing techniques to capture an image of an indicia and/or a digital watermark carried by a portion of an object. More specifically, the image sensor 110 may include any of a variety of light sensing components to effect the capture of an image that may include one or more indicia and/or digital watermarks, including and not limited to, a charge-coupled device (CCD) providing a single row of individual light sensors operated in a manner that sweeps over indicia and/or digital watermarks to perform a scan thereof, or a CCD providing a two-dimensional (2D) array of individual light sensors to capture a 2D image of one or more indicia and/or digital watermarks. In some embodiments, the image sensor 110 and/or another component of the camera 100 may emit various forms of collimated and/or monochromatic light, including light that projects any of a variety of patterns onto a surface of an object that carries one or more indicia and/or digital watermarks. As those skilled in the art will readily recognize, such an emission of light may be to provide sufficient illumination to ensure that an indicia and/or a digital watermark is sufficiently visible to be captured, and/or may provide a visible pattern of markers on a surface of an object, an indicia and/or a digital watermark as a guide to determining the orientation of the indicia and/or digital watermark relative to the image sensor 110 to improve the accuracy with which the data encoded within the indicia may be decoded.

The skew sensor 210 may be based on any of a variety of technologies and/or may employ any of a variety of optical, sonic, magnetic, mechanical and/or other techniques to detect a degree of skew between the plane of a surface of the object that may carry one or more indicia and/or digital watermarks and the plane of the image captured by the image sensor 110. Alternatively or additionally, the emission of collimated light and/or other technologies incorporated into the image sensor 110 and/or the camera 100 may be employed to detect such a degree of skew.

The object onto which one or more indicia and/or digital watermarks may be applied may be any of a variety of objects, including and not limited to, a package carrying a shipping label that includes an indicia, or a product for sale within retail packaging on which an indicia is printed as part of the graphical artwork thereof. The data encoded within such indicia and/or digital watermark(s) may include, and not be limited to, data indicating the addresses of a sender and/or intended recipient of a package, or data providing a universal product code (UPC) that uniquely identifies a product for sale.

Such an indicia may be any of a variety of forms of 1D optically readable indicia (e.g., a barcode) or 2D optically readable indicia (e.g., a QR code), including and not limited to, one or more of Codabar; Code 25 (Interleaved); Code 25 (Non-interleaved); Code 11; Code 39; Code 93; Code 128; CPC Binary; DUN 14; EAN 2; EAN 5; EAN-8, EAN-13; Facing Identification Mark; GS1-128; GS1 DataBar; HIBC; Intelligent Mail barcode; ITF-14; JAN; KarTrak ACI; Latent image barcode; MSI; Pharmacode; PLANET; Plessey; Post-Bar; POSTNET; RM4SCC/KIX; Telepen; UPC; Aztec Code; Code 1; ColorCode; Color Construct Code; Cronto-Sign; CyberCode; d-touch; DataGlyphs; Data Matrix; Datastrip Code; digital paper; EZcode; Color; High Capacity Color Barcode; HueCode; InterCode; MaxiCode; MMCC; NexCode; Nintendo e-Reader; Dotcode; PDF417; QR code; ShotCode; and SPARQCode.

The storage 360 may be based on any of a variety of volatile storage technologies, including and are not limited to, random-access memory (RAM), dynamic RAM (DRAM), Double-Data-Rate DRAM (DDR-DRAM), synchronous DRAM (SDRAM), static RAM (SRAM), etc. Alternatively or additionally, the storage 360 may be based on any of a variety of non-volatile storage technologies.

The processor 350 may include any of a wide variety of processors, microcontrollers, gate-array logic devices, etc. that may be incorporate any of a variety of features to enhance speed and/or efficiency of processing operations. Such features may include and are not limited to, multi-threading support per core component 351, multiple processing core components 351, directly integrated memory control functionality, and/or various modes of operation by which speed of throughput and/or level of power consumption may be dynamically altered.

Although only one SIMD component 355 is depicted within the processor 350, other embodiments are possible in which there may be multiple SIMD components 355 incorporated into the processor 350 and/or distributed among multiple ones of the processor 350 that may be incorporated into the decoding device 300. Also, although the SIMD component 355 is depicted as separate from the one or more core components 351, other embodiments are possible in which the SIMD component 355 may be a component of a core component 351. Alternatively or additionally, where there are multiple core component 351, more than one of the multiple core components 351 may each include at least one SIMD component 355.

It should be noted that, although not specifically depicted, the processor 350 may integrate various forms of graphics generation and/or transcoding functionality by incorporating one or more graphics processing units (GPUs) as component. In such embodiments, one or more of the SIMD component 355 may be incorporated into each such GPU. In still other embodiments, the processor 350 may be a GPU that in some way incorporates one or more of the SIMD component 355, and/or the decoding device 300 may incorporate a GPU that is separate and distinct from the processor 350, and that may incorporate one or more of the SIMD component 355 in addition to or in lieu of the processor 350 doing so.

Each of the network interfaces 190, 290 and 390 may employ any of a variety of wireless communications technologies, including and not limited to, radio frequency transmission, transmission incorporated into electromagnetic fields by which electric power may be wirelessly conveyed, and/or any of a variety of types of optical transmission. Additionally, the network interfaces 190, 290 and 390 may each be configured to engage in communications that adhere in timings, protocol and/or in other aspects to one or more known and widely used standards, including and not limited to IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 2B:
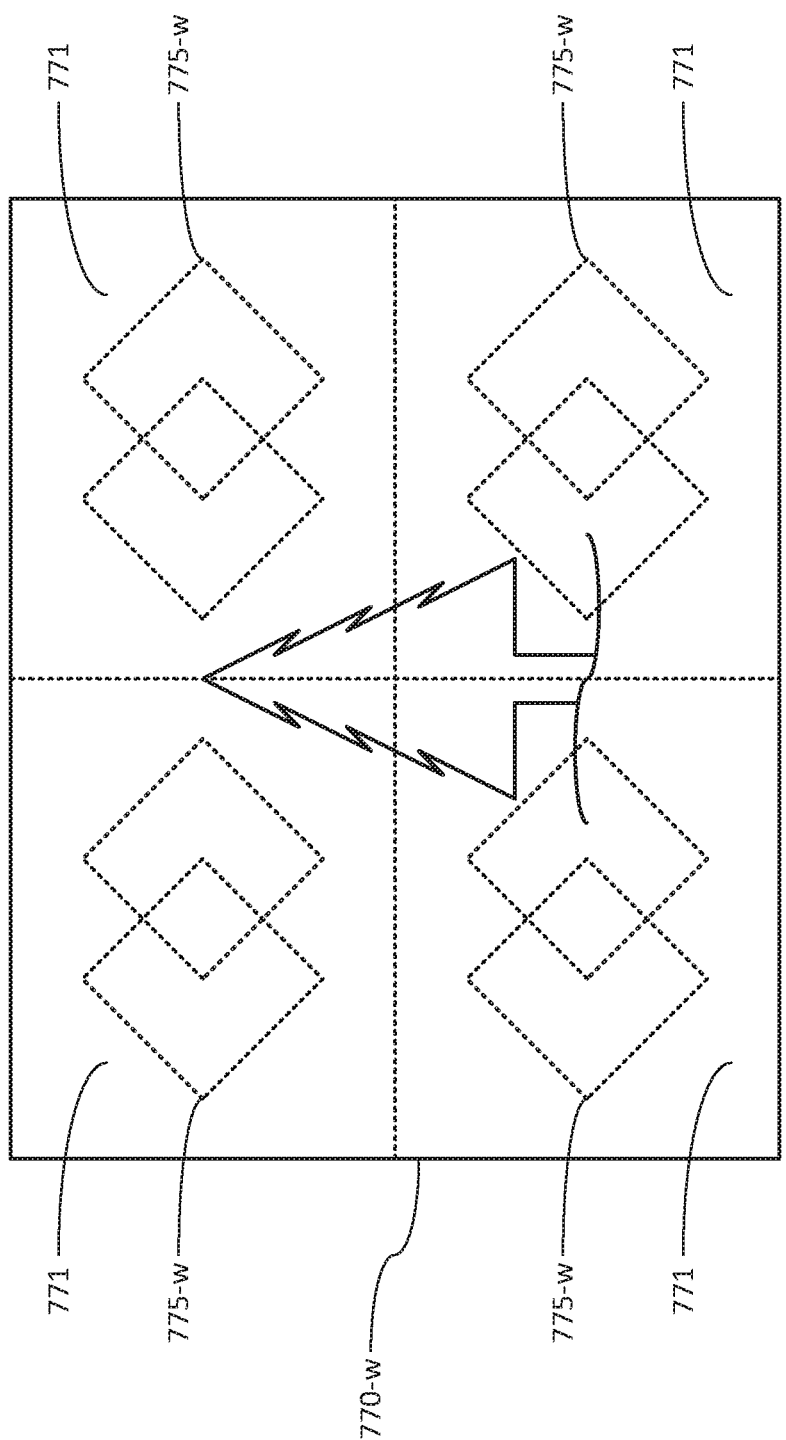

FIGS. 2A and 2B, together, depict aspects of an example of use of an example implementation of the decoding system 1000 of FIG. 1 in capturing, identifying and decoding a 1D indicia 775-1 carried on a label or portion 770-1 of an object 700, a 2D indicia 775-2 carried on a label or portion 770-2 of the object 700, and/or a digital watermark 775-w incorporated into an image carried on a label or portion 770-w of the object 700. More specifically, FIG. 2A provides a combination of perspective view and block diagram of an example implementation of the decoding system 1000 that includes the camera 100 positioned to place a location through which the object 700 is moved within its field of view (FOV) 117 and/or the sensor device 200 positioned to enable the detection of the skew of at least one surface of the object 700 relative to the plane of the image captured by the camera 100. FIG. 2B provides a block diagram depicting aspects of the manner in which the digital watermark 775-w may be incorporated into an image carried on the label or portion 770-w of the object 700 so as to be tiled thereon.

While this example is introduced with FIGS. 2A and 2B, aspects of the identification and decoding of the 1D indicia 775-1, the 2D indicia 775-2 and/or the digital watermark 775-w are depicted in, and will be further discussed in reference to, other figures herein.

Turning more specifically to FIG. 2A, it should be noted that this depiction of an example of use of an implementation of the decoding system 1000 is but one possible example provided herein for purposes of illustration, and should not be taken as limiting. Stated differently, other uses of other implementations of the decoding system 1000 are possible in which the object 700 may be any of a variety of objects other than a package moved through a location within the FOV 117 of the camera 100, and/or in which the camera 100 may be mounted to a vehicle or other movable platform such that it is the camera 100 that is moved relative to the object 700, instead of the object 700 being moved relative to the camera 100.

Turning more specifically to FIG. 2B, while the object 700 may carry only a single instance of either the 1D indicia 775-1 or the 2D indicia 775-2, the object 700 may carry multiple instances of the digital watermark 775-w incorporated into a single surface-carried image (e.g., the depicted example surface-carried image of a pine tree planted atop a rolling portion of land) on the label or portion 770-w of the object 700. Stated differently, the digital watermark 775-w, may be repeated across the surface of the label or portion 770-w of the object 700 in multiple tiles 771.

Figure 3A:
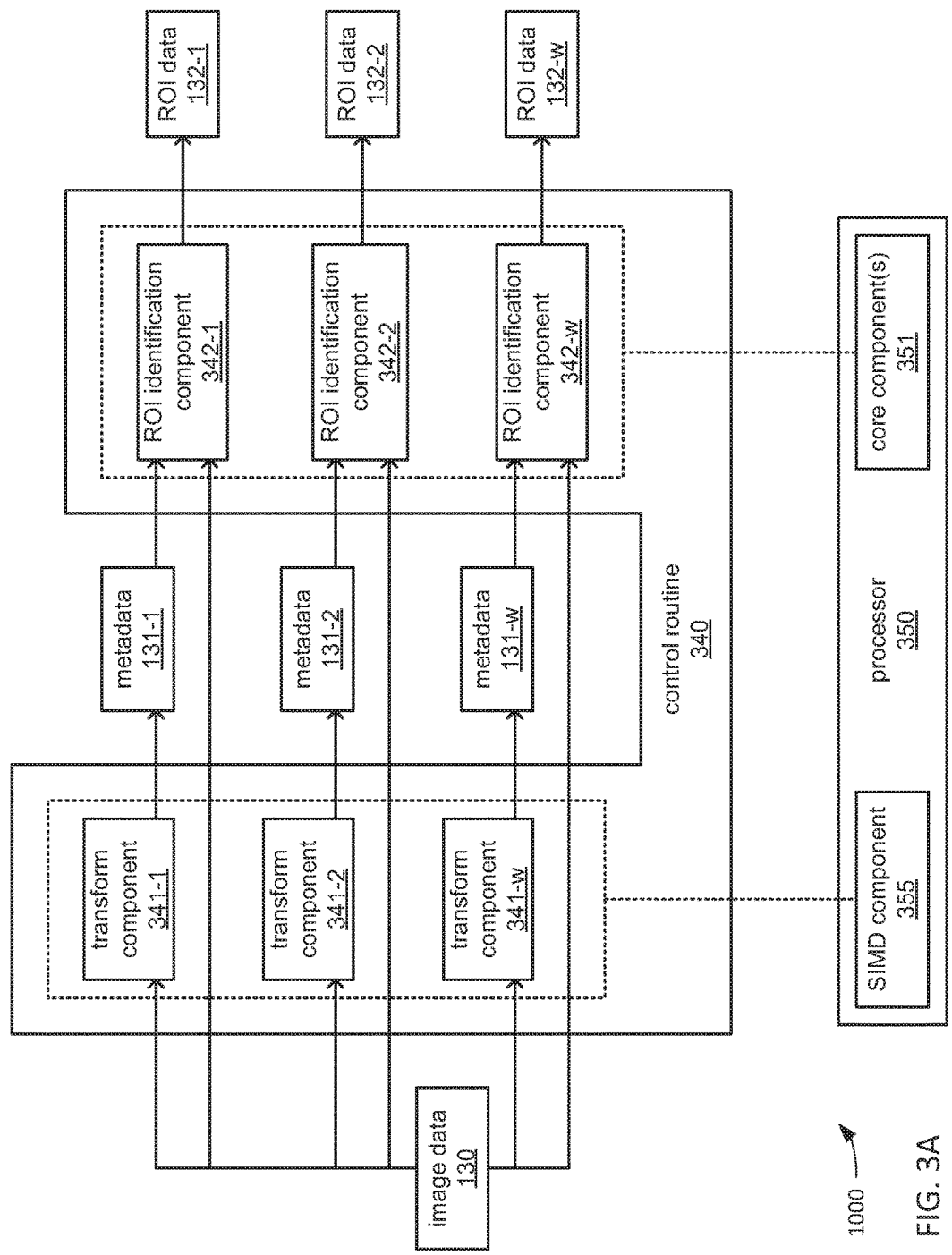
FIGS. 3A and 3B, together, show aspects of a use of parallelism in identification and/or decoding in a decoding device of the system of FIG. 1.
Figure 3B:
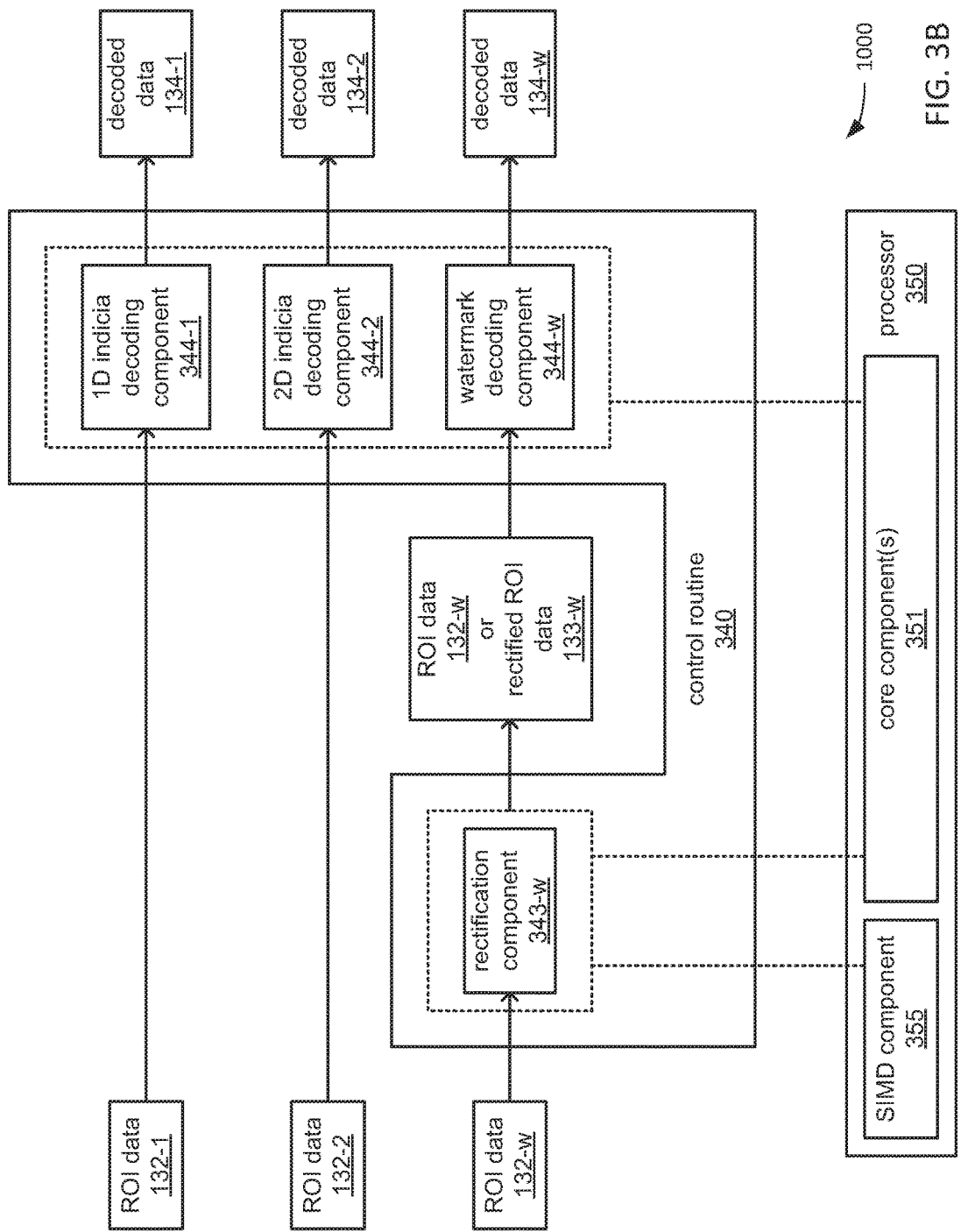

FIGS. 3A and 3B, together, depict aspects in greater detail of an internal architecture of an embodiment of the decoding device 300 of the decoding system 1000, where some degree of parallelism may be used within the decoding device 300 to identify and/or decode the 1D indicia 775-1, the 2D indicia 775-2 and/or the digital watermark 775-w of the example of FIGS. 2A-B. As previously discussed, differing combinations of indicia and/or digital watermark(s) may be identified and/or decoded in differing implementations of the decoding system 1000. Thus, while FIGS. 3A-B depict an example of the identification and decoding of all three of the 1D indicia 775-1, the 2D indicia 775-2 and the digital watermark 775-w, other example embodiments are possible in which less than all three of these may be identified and decoded.

Turning more specifically to FIG. 3A, the SIMD component 355 of the processor 350 may be caused to execute instructions of separate transform components 341-1, 341-2 and/or 341-w to perform differing transforms on grayscale values of the pixels of the image captured by the camera 100 (and stored as the image data 130) to generate the metadata 131-1, 131-2 and/or 131-w, respectively. As indicated in this depiction of separate transform components 341-1, 341-2 and 341-w, in some embodiments, the types of transforms that may be performed in preparation for identifying ROIs at which the 1D indicia 775-1, the 2D indicia 775-2 and the digital watermark 775-w may be different transforms. The selection of one or more transforms to generate metadata to enable identification of ROIs for each of the 1D indicia 775-1, the 2D indicia 775-2 and the digital watermark 775-w may be based on the differing characteristics of each. By way of example, a transform selected to prepare for the identification of a ROI in which a 1D barcode may be present through detection of the pattern of multiple parallel lines of a typical barcode may be undesirably ineffective in preparing for the identification of a ROI in which a 2D QR code may be present, since a QR code would have no such pattern of multiple parallel lines.

Following generation of the metadata 131-1, 131-2 and/or 131-w, one or more core components 351 of the processor 350 may be caused to execute instructions of separate ROI identification components 342-1, 342-2 and/or 342-w to analyze metadata 131-1, 131-2 and/or 131-w, respectively, to identify ROI(s). If a ROI is identified through the execution of the ROI identification components 342-1, 342-2 and/or 342-w, then corresponding one(s) of the ROI data 132-1, 132-2 and/or 132-w, respectively, may be generated that each contain at least one portion of the captured image of the image data 130 within the ROI(s). Again, as indicated in this depiction of separate ROI identification components 342-1, 342-2 and 342-w, in some embodiments, the types of analyses performed of metadata to identify ROI(s) may necessarily be based on the different one or more transforms used to generate each of the different ones of the metadata 131-1, 131-2 and 131-w, respectively.

In some embodiments, one or more of the ROI identification components 342-1, 342-2 and 342-w may be performed at least partially in parallel as a result of being executed by different ones of the core components 351, and/or on different threads of execution supported by one or more core components 351. It should be noted that, although only a single SIMD component 355 is depicted and discussed herein as incorporated into the processor 350, embodiments are possible in which there may be more than one SIMD component 355 incorporated into the processor 350 and/or distributed among multiple ones of the processor 350 in embodiments in which the decoding device 300 includes more than one of the processor 350. Thus, in some embodiments, there may be separate SIMD components 355 that each perform the one or more transforms of a different one of the transform components 341-1, 341-2 and/or 341-w.

Turning more specifically to FIG. 3B, the SIMD component 355 may be caused to execute instructions of a rectification component 343-w to perform rectification through use of homography with the portion of the captured image that is stored as the ROI data 132-w to eliminate or reduce the skew between the plane of the label or portion 770-w of the object 700 (referring back to FIGS. 2A-B) and the plane of the image captured by the image sensor 110. The resulting rectified ROI(s) may be stored as the rectified ROI data 133-w. As previously discussed, it may be that the decoding of the digital watermark 775-w is less tolerant of such skew than the decoding of either of the 1D indicia 775-1 or the 2D indicia 775-2 such that the decoding of the digital watermark 775-w may be more easily impaired by a degree of skew that may have little or no adverse affect on the decoding of either the 1D indicia 775-1 or the 2D indicia 775-2. It is for this reason that there is no specific depiction in FIG. 3B of equivalent rectification components to perform rectification with either of the ROI data 132-1 or 132-2. However, as previously noted, other embodiments are possible in which rectification may be so performed in preparation for the decoding of either the 1D indicia 775-1 or the 2D indicia 772-2, either in lieu of or in addition to, the performance of rectification in preparation for the decoding of the digital watermark 775-w.

As will be explained in greater detail, in some embodiments, a core component 351 may also execute instructions of the rectification component 343-w to make a determination of whether the SIMD component 355 is to perform rectification. Such a determination may be based on a history of rates of relative success and/or failure in the performance of the decoding data encoded within digital watermarks for different ROIs that may or may not be rectified ROIs. Alternatively or additionally, such a determination may be based on received indications of a degree of skew (e.g., received from the sensor device 200, see FIG. 1).

Following whatever rectification that may be performed with any of the ROI(s) stored within any of the ROI data 132-1, 132-2 or 132-w, one or more core components 351 of the processor 350 may be caused to execute instructions of the separately depicted 1D indicia decoding component 344-1, 2D indicia decoding component 344-2 and/or watermark decoding component 344-w, to attempt to decode data encoded within the 1D indicia 775-1, the 2D indicia 775-2 and/or the digital watermark 775-w, respectively. If such decoding of the 1D indicia 775-1, the 2D indicia 775-2 and/or the digital watermark 775-w is successful, then corresponding one(s) of the decoded data 134-1, 134-2 and/or 134-w, respectively, may be generated that each contain corresponding decoded data in preparation for transmission to another device (e.g., the server 900, see FIG. 1). In some embodiments, one or more of the decoding components 344-1, 344-2 and 344-w may be performed at least partially in parallel as a result of being executed by different ones of the core components 351, and/or on different threads of execution supported by one or more core components 351.

FIGS. 4A, 4B, 4C and 4D, together, depict aspects of an example of identification and decoding of the 1D indicia 775-1 of FIGS. 2A-B by an implementation of the decoding system 1000 in greater detail. It should also be noted that, despite the depiction of a barcode as the example indicia 775-1 throughout the figures, other embodiments are possible in which the 1D indicia 775-1 may be of a different type.

Figure 4A:
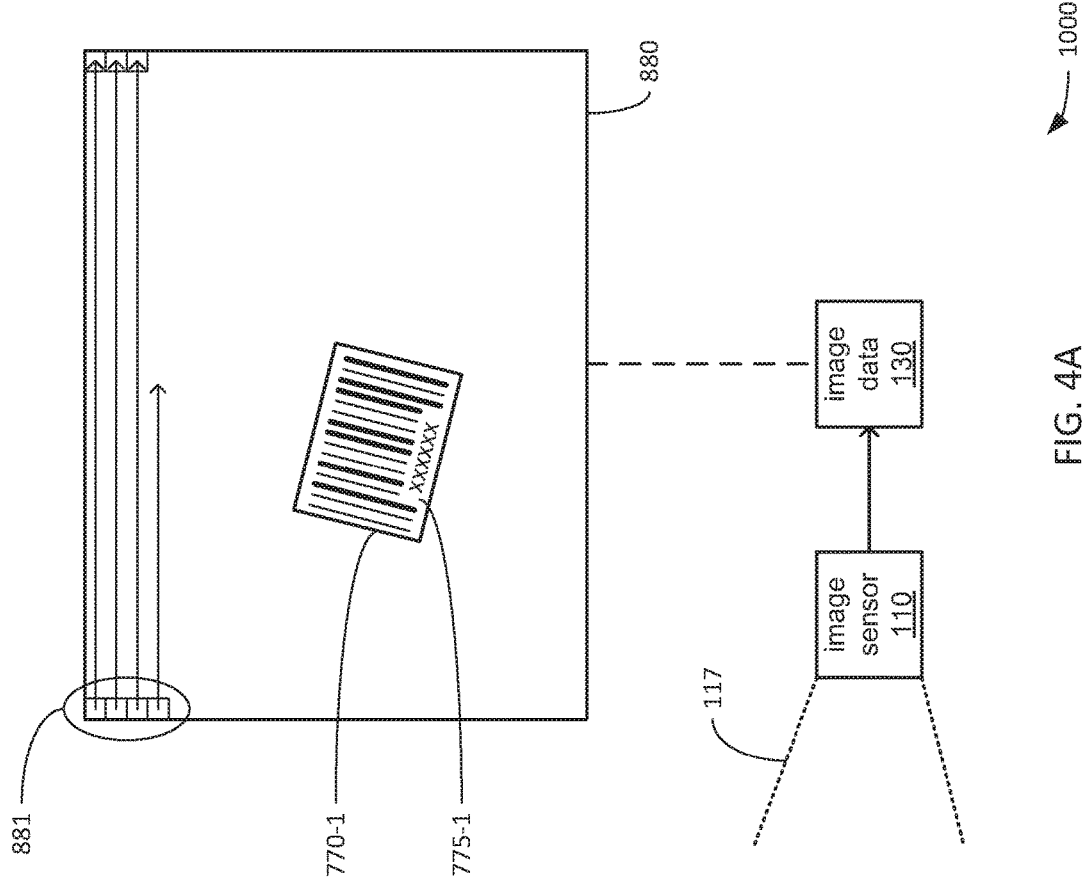

Turning to FIG. 4A, the image sensor 110 of the camera 100 of the decoding system 1000 may capture an image 880 in its FOV 117 of the label or portion 770-1 of the object 700 (see FIG. 2A) that carries the 1D indicia 775-1 such that the 1D indicia 775-1 may be included in the captured image 880. As will be familiar to those skilled in the art, at least in embodiments in which the image sensor 110 is implemented as a CCD or other type of light sensing device incorporating a 2D array of light sensing elements, the image sensor 110 may output a serial bitstream of values indicating the grayscale levels detected by separate ones of the light sensing elements of the pixels 881 of the captured image 880. As depicted, the order in which those grayscale values in the serial bitstream are output by the image sensor 110 may follow a left-to-right raster scan order within each horizontal row of pixels 881 of the captured image 880, starting with the top row and progressing row-by-row from top-to-bottom of the captured image 880.

In some embodiments, the decoding system 1000 may be configured to cause the camera 100 to take capture an image of the object 700 within its FOV 117. Thus, there would be only the one captured image 880 captured by the image sensor 110 to be processed. Such triggering may be based on the output of a sensor (not shown) that detects the proximity of the object 700, and that is monitored by the decoding device 300, which may transmit a command to the camera 100 via the network 999 to trigger the capture of the single image 880. Alternatively, in other embodiments, the decoding system 1000 may be configured to cause the camera 100 to recurringly capture images on timed basis, such as at selected frame rate. Thus, at a recurring interval of time, the image sensor 110 of the camera 100 would capture a new image to be processed, where each such image may or may not include an image of an that may or may not carry any indicia, whatsoever.

Regardless of whether the image sensor 110 captures only the single captured image 880 of the object 700, or multiple images in a succession in which only a subset may include an image of the object 700, a core component 351 of the processor 350 may store the bitstream received from the sensor 110 of the captured image 880 as the image data 130 within the storage 360. More precisely, the grayscale values of the pixels 881 of the captured image 880 may be stored by as the image data 130.

In some embodiments, the image sensor 110 of the camera 100 may be a monochrome image sensor capable of capturing monochromatic images such that there is only a single grayscale value for each pixel 881. In such embodiments, each of the grayscale values may be a byte-wide (i.e., 8-bit) value that specifies an intensity level of a separate one of the pixels 881 (although grayscale values of greater or lesser bit width may also be used). However, in other embodiments, the image sensor 110 of the camera 100 may be a color image sensor capable of capturing color images such that there may be multiple values for each pixel 881, including one or more grayscale values for each pixel 881. More precisely, in such other embodiments, a color space encoding scheme may be used in which the color of each pixel 881 is specified with multiple grayscale values that each specify a relative level of intensity of a different color component of the color, such as and not limited to, red-green-blue (RGB) or cyan-magenta-yellow-black (CMYK). RGB color space encoding often entails the allocation of 8, 12, 16, 24 or 32 bits per pixel to store the three grayscale values for the red, green and blue intensities. Alternatively, a color space encoding scheme may be used in which the color of each pixel 881 is specified with a single grayscale value that specifies an intensity level accompanied by one or more chrominance values that specify a color that is mapped to the one or more chrominance values, such as and not limited to, luminance-chrominance (YUV). Therefore, as used herein, the term "grayscale value" is intended to denote the single value specifying the level of intensity of either a single monochromatic pixel 881 or a single color pixel 881, or is intended to denote one of the multiple grayscale values specifying the level of intensity of a color component of one of the color components that specify the color of a single pixel 881.

Figure 4B:
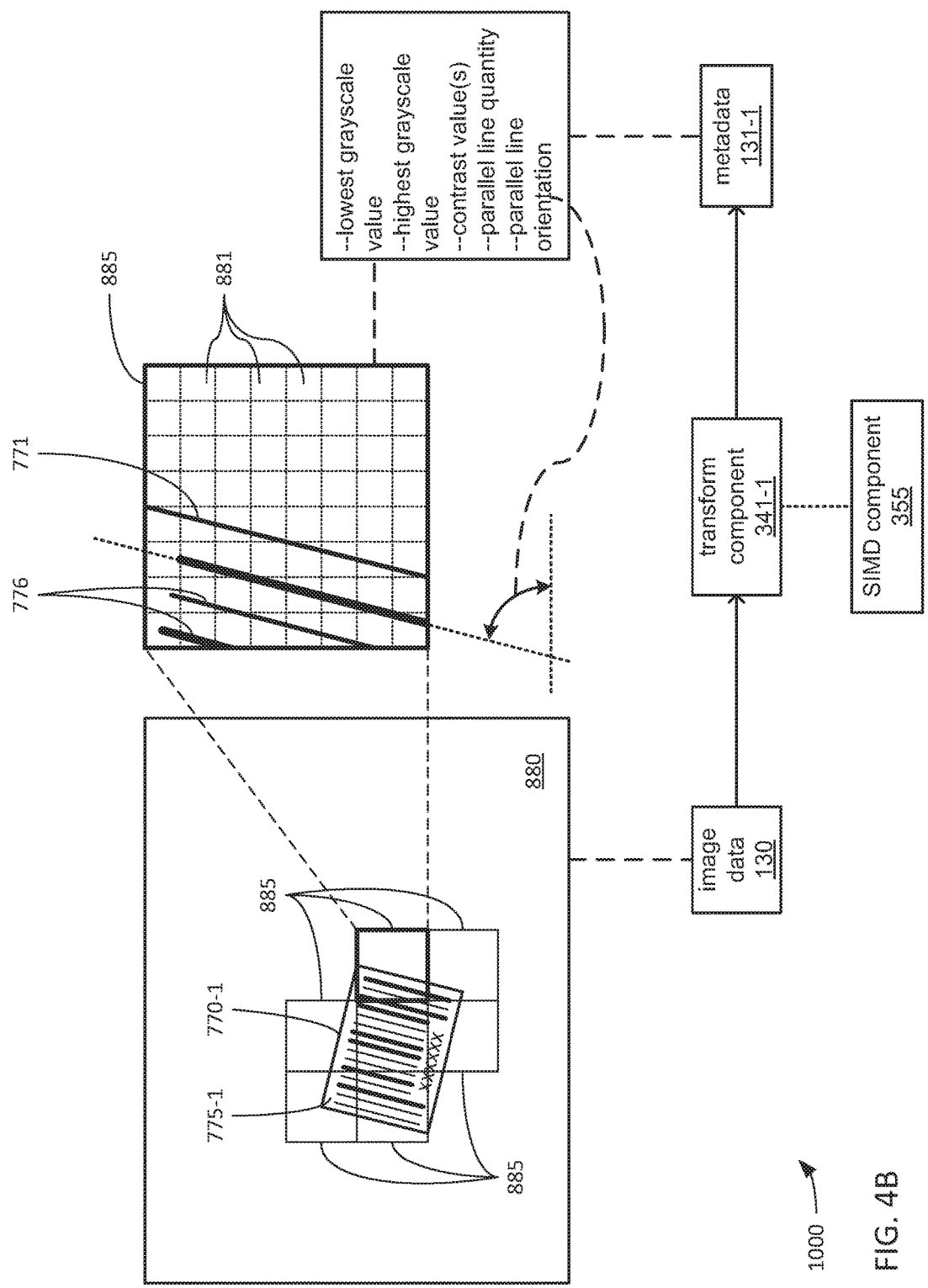

Turning to FIG. 4B, as previously discussed, the SIMD component 355 may execute instructions of the transform component 341-1, thereby causing the SIMD component 355 to perform one or more transforms to generate the metadata 131-1 in preparation for subsequent processing to identify one or more ROIs within the captured image 880 in which the 1D indicia 775-1 may be present. In so doing, the SIMD component 355 may be caused to divide the captured image 880 into multiple tiles 885 (of which only a few are shown for sake of clarity). Each tile 885 may be defined by a 2D array of the pixels 881 of the captured image 880 (e.g., an 8×8 array, a 16×16 array, etc.). For each one of the tiles 885, the a separate portion of one or more SIMD registers of the SIMD component 355 may be used to perform a transform with the grayscale values retrieved from the image data 130 for each of the pixels 881 within each tile 885 to derive corresponding metadata data values for each tile 885 that may be stored as the metadata 131-1.

As previously discussed, the image sensor 110 may output a serial bitstream of grayscale values organized in horizontal raster scan order starting with the topmost horizontal row and proceeding downward to the bottommost horizontal row. In such embodiments, advantage may be taken of this ordering of grayscale values to perform the S-transform on whole horizontal rows of the tiles 885 at a time, as the image sensor 110 provides grayscale values for a sufficient number of horizontal rows of pixels 881 to enable at least the commencement of performance of the S-transform with each successive horizontal row of tiles 885. More specifically, advantage may be taken of this ordering to utilize one or more SIMD registers of the SIMD component 335 to perform the S-transform simultaneously within all of the tiles 885 within whole horizontal rows of the tiles 885, starting with the topmost row of the tiles 885.

In some embodiments, the transform that is performed may be the Saporetti transform (S-transform) described in U.S. Pat. No. 6,047,893 issued Apr. 11, 2000, to Claudio Saporetti, the disclosure of which is incorporated herein by reference. Among the metadata values that may be generated for a tile 885 from a performance of the S-transform therewith may be metadata values indicating the highest and lowest grayscale values found among the pixels 881 within the tile 885, the greatest contrast in grayscale values found within the tile 885, a quantity of parallel lines found within the tile 885 (if any), and/or an orientation angle of the parallel lines (if any are found). The S-transform may be implemented in any of a variety of ways providing a greater or lesser degree of accuracy, and may be implemented in any of a variety of ways selected to ease the use of one or more SIMD registers of the SIMD component 355 to perform the S-transform.

However, it should be noted that other embodiments are possible in which one or more other transforms and/or other types of analyses may be performed with the grayscale values of the pixels 881 within each tile 885 to generate metadata values for each tile 885. Such other transforms and/or analyses may be performed either in lieu of or in addition to the S-transform. By way of example, in some embodiments, one or more filters and/or spatial transforms may be utilized to condition the grayscale values of the pixels 881 prior to the performance of the S-transform.

Figure 5C:
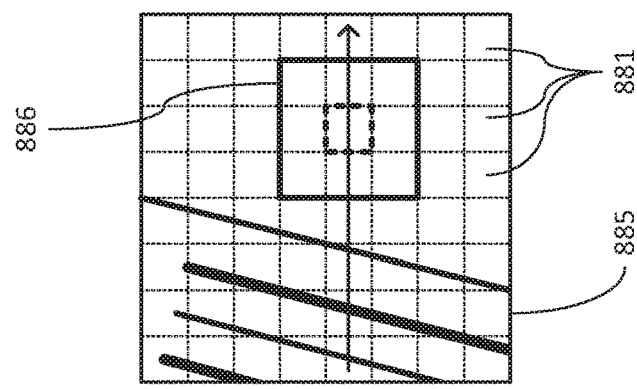
FIGS. 5A, 5B and 5C, together, show aspects of convolving a stencil to perform a transform.
Figure 5B:
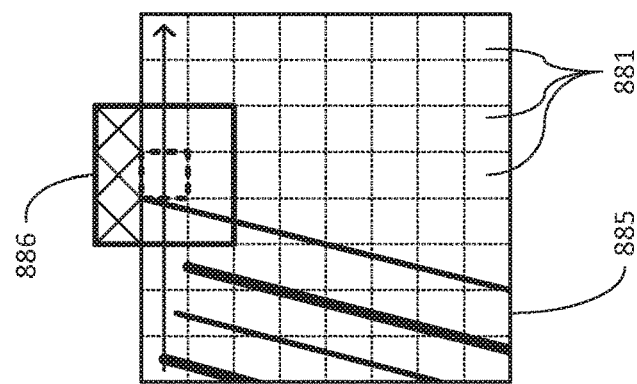
Figure 5A:
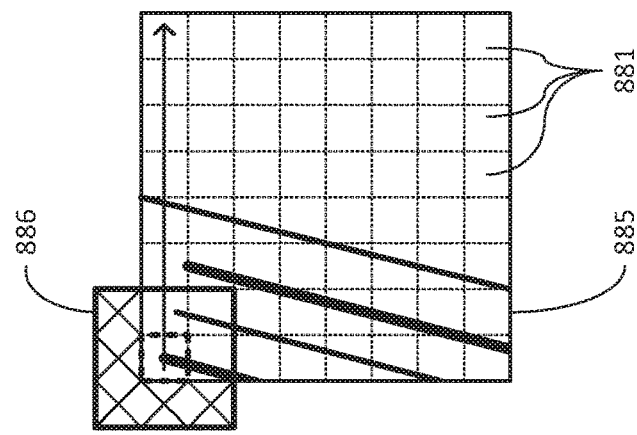
Figure 6C:
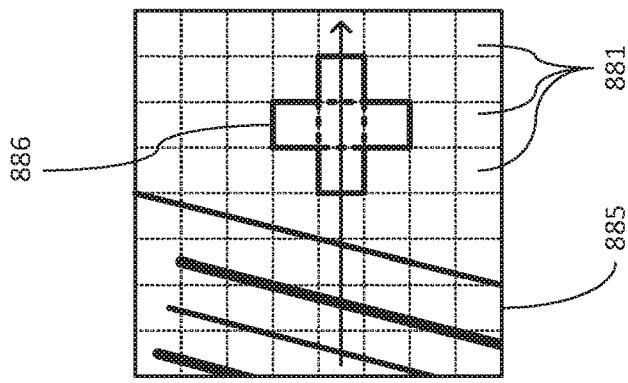
FIGS. 6A, 6B and 6C, together, show aspects of convolving an alternate stencil to perform a transform.
Figure 6B:
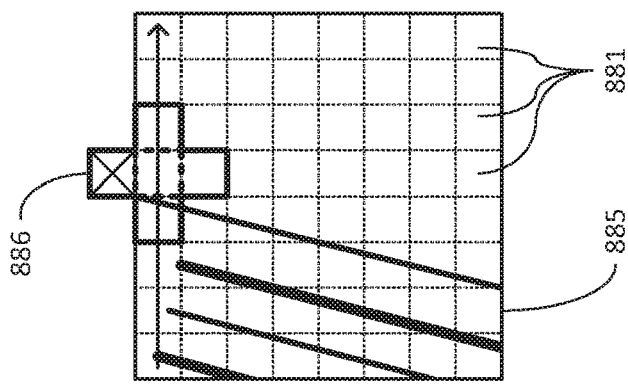
Figure 6A:
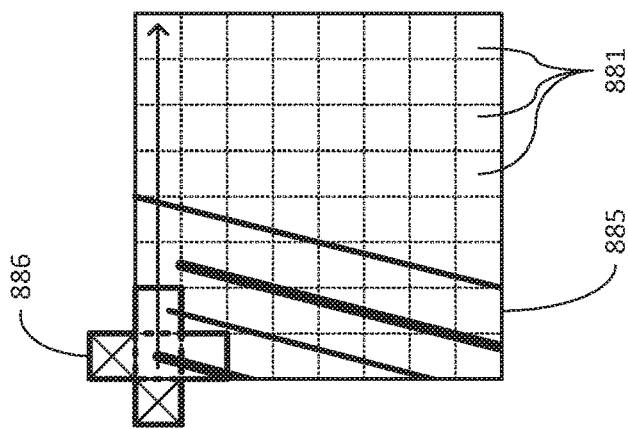

In performing at least the S-transform, a stencil may be convolved about the 2D array of pixels 881 within each of the tiles 885. FIGS. 5A, 5B and 5C, together, depict an example of convolving a square-shaped form of a stencil 886 made up of a 3×3 array of pixels 881. FIGS. 6A, 6B and 6C, together, depict an example of convolving a cross-shaped form of the stencil 886 made up of less than all of a 3×3 array of pixels 881. As will be familiar to those skilled in the art, any of a variety of techniques may be employed to address the occurrences of part of the stencil 886 (regardless of its shape) extending beyond the boundaries of the tile 885 about which it is convolved such that pixels 881 of one or more neighboring tiles 885 may be covered by the stencil 886 and/or occurrences of part of the stencil 886 extending beyond the boundaries of the captured image 880 such that part of the stencil 886 extends to where there are no pixels 881. As depicted, in such instances, no grayscale values that may be present within the part of the stencil 886 that extends beyond the boundaries of the tile 885 and/or beyond the boundaries of the captured image 880 are included in the S-transform calculations associated with the stencil 886.

Returning to FIG. 4B, as depicted within one of the tiles 885 for which an enlarged view is provided, the performance of the S-transform with the grayscale values of the pixels 881 thereof may beget a metadata value indicating either three or four parallel lines depending on whether the depicted border of the label or portion 770-1 of the object 700 on which the lines 776 of the depicted barcode example of the 1D indicia 775-1 are printed.

Turning more specifically to FIG. 4C, as previously discussed, one or more core components 351 of the processor 350 may be caused to execute instructions of the ROI identification component 342-1 to perform an analysis of one or more metadata values within the metadata 131-1 for each tile 885 to identify a cluster of adjacent tiles 885 within the captured image 880 that may include an image of the 1D indicia 775-1. Thus, as is about to be explained, the identification of a ROI in which the 1D indicia 775-1 may be present may entail the identification of a cluster of adjacent tiles 885 that are found to have characteristics suggestive of including the 1D indicia, such that the cluster of adjacent tiles 885 serve to define at least a portion of such an identified ROI.

In some embodiments, such an analysis may entail a comparison of metadata values, such as highest and lowest grayscale values, highest contrast value, quantity of parallel lines and/or angle of orientation of those parallel lines to corresponding ones of various threshold values included within the parameter data 335. Such threshold values may include minimum and/or maximum grayscale thresholds, a minimum contrast threshold and/or a minimum quantity of parallel lines. Thus, in performing such an analysis, per tile 885, the at least one core component 350 may be caused to compare the indications in the metadata 131-1 for the lowest and highest grayscale values, the highest contrast value and/or the quantity of lines associated with each of the tiles 885 to such thresholds to determine whether such characteristics of the tile 885 are consistent with that tile 885 including a portion of the 1D indicia 775-1.

Upon identifying ones of the tiles 885 having characteristics consistent with including a portion of the indicia 775-1, the one or more core components 351 may then be caused to identify one or more clusters of adjacent ones of such tiles 885 where the quantity of such adjacent tiles 885 meets a minimum adjacent tile quantity threshold specified in the parameter data 335. Additionally, the one or more core components 351 may be caused to compare the metadata values indicating an angle of orientation of the parallel lines found within each of the tiles 885 of each such cluster to determine whether their angles of orientation match. By way of example, for a barcode such as the example 1D indicia 775-1, the lines 776 are parallel to each other, and therefore, should have the same angle of orientation across the all of the tiles 885 into which they extend. However, if the indicated angle of orientation differs between two adjacent tiles 885, then the angles of orientation may be presumed to belong to unrelated sets of parallel lines such that the lines 776 that may be present within one of the two adjacent tiles 885 may be presumed to not extend into the other of the two adjacent tiles 885.

In various embodiments, the thresholds specified in the parameter data 335 may be based on experimentation with examples of indicia having the characteristics expected to be encountered in the indicia that are meant to be identified and decoded by the decoding system 1000. As will be familiar to those skilled in the art, different types of indicia may have differing densities of lines, blocks and/or other graphical elements. Also, the expected size of such indicia and the distance that the camera 100 is expected to be from such indicia must be taken into account. As a result, the parameter data 335 may include a set of initial values for such thresholds to be used as a starting point in the performance of various tests of an installation of the decoding system 1000 under the conditions in which it is to be used to adjust the threshold values. Such testing may also be required to adjust an initial value that may be included within the parameter data 335 for a minimum quantity of adjacent tiles 885 for a cluster. As with one or more of the other threshold values, the expected size of the 1D indicia 775-1 and the expected distance of the camera 100 from the 1D indicia 775-1 may affect the minimum quantity of adjacent tiles 885 for a cluster.

Upon identifying a cluster of adjacent tiles 885 that is of sufficient quantity among the tiles 885 of the captured image 880, the one or more core components 351 may be caused by execution of the ROI identification component 342-1 to retrieve the grayscale values within the image data 130 for the pixels 881 of the portion of the captured image 880 that is included within a ROI 889-1 that may include the 1D indicia 775-1 based on the identified cluster. The one or more core components 351 may then be caused to store those grayscale values of the pixels 881 within the ROI 889-1 as the ROI data 132-1.

In some embodiments, the one or more core components 351 may be caused to increase the size of the ROI 889-1 beyond the leftmost, rightmost, topmost and bottommost boundaries of the identified cluster of tiles 885 to ensure that all of the 1D indicia 775-1 is included within the ROI 889-1. Such increasing of the size of the ROI 889-1 may be deemed desirable to counteract situations in which a small enough portion of the 1D indicia 775-1 is included within a tile 885 that one or more of the metadata values generated by the performance of the transform for that tile 885 do not meet one or more of the thresholds. By way of example, if too small a quantity of the lines 776 of the 1D indicia 775-1 fall within one of the tiles 885, then the resulting metadata value specifying the quantity of parallel lines 776 within that tile 885 may be too low.

Figure 4D:
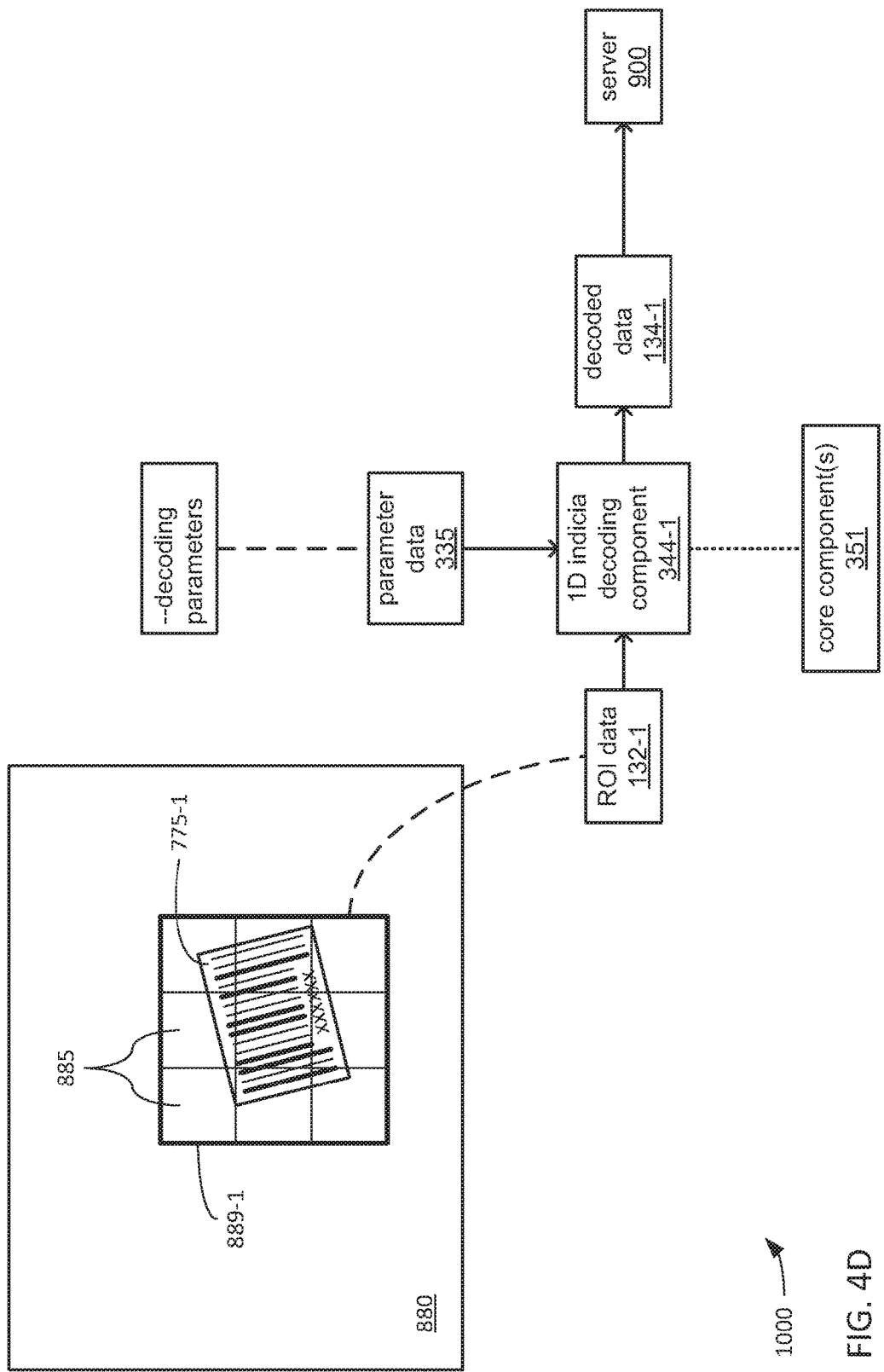

Turning to FIG. 4D, as previously discussed, one or more core components 351 of the processor 350 may be caused to execute instructions of the 1D indicia decoding component 344-1 to perform an perform an interpretation of the 1D indicia 775-1 to decode the data that is encoded therein. If such decoding is successful, then the one or more core components 351 may store that data as the decoded data 134-1. In interpreting the 1D indicia 775-1 within the ROI 889-1, the one or more core components 351 may employ various decoding parameters that may also be stored as part of the parameter data 335. Such decoding parameters may include one or more sets of rules by which an indicia that adheres to one or more standards for 1D indicia may be interpreted. Following the interpretation of the 1D indicia 775-1 and the storage of the decoded data 134-1 therefrom, the one or more core components 351 may be caused to operate the network interface 390 to transmit the decoded data 134-1 to the another device via the network 999, such as the depicted server 900.

FIGS. 7A, 7B, 7C and 7D, together, depict aspects of an example of identification and decoding of the digital watermark 775-w of FIGS. 2A-B by an implementation of the decoding system 1000 in greater detail.

Figure 7A:
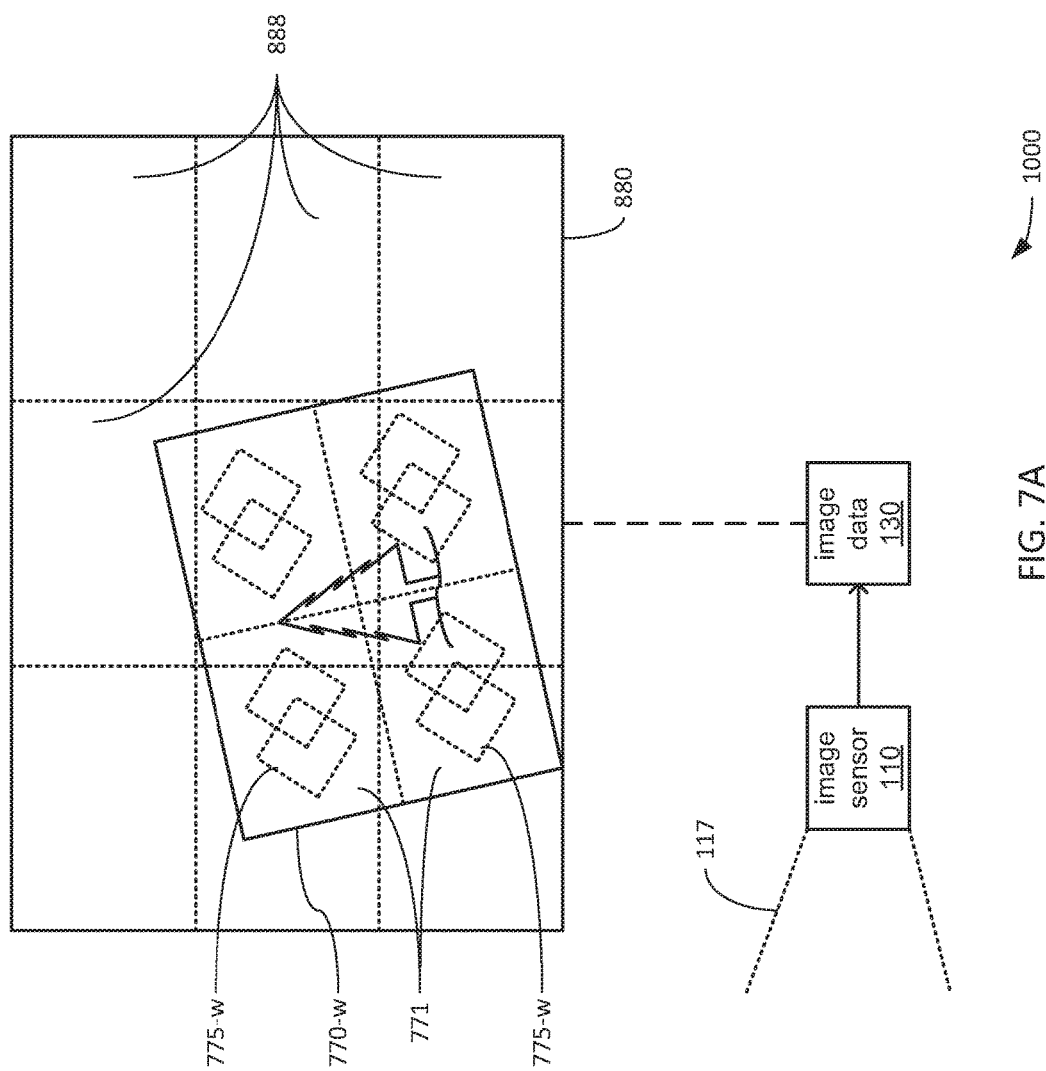

Turning to FIG. 7A, the image sensor 110 of the camera 100 of the decoding system 1000 may capture an image 880 in its FOV 117 of the label or portion 770-w of the object 700 (see FIGS. 2A-B) that carries the digital watermark 775-w such that the digital watermark 775-w may be included in the captured image 880. Again, a core component 351 of the processor 350 may store the bits received from the sensor 110 of the captured image 880 as the image data 130 within the storage 360.

Figure 7B:
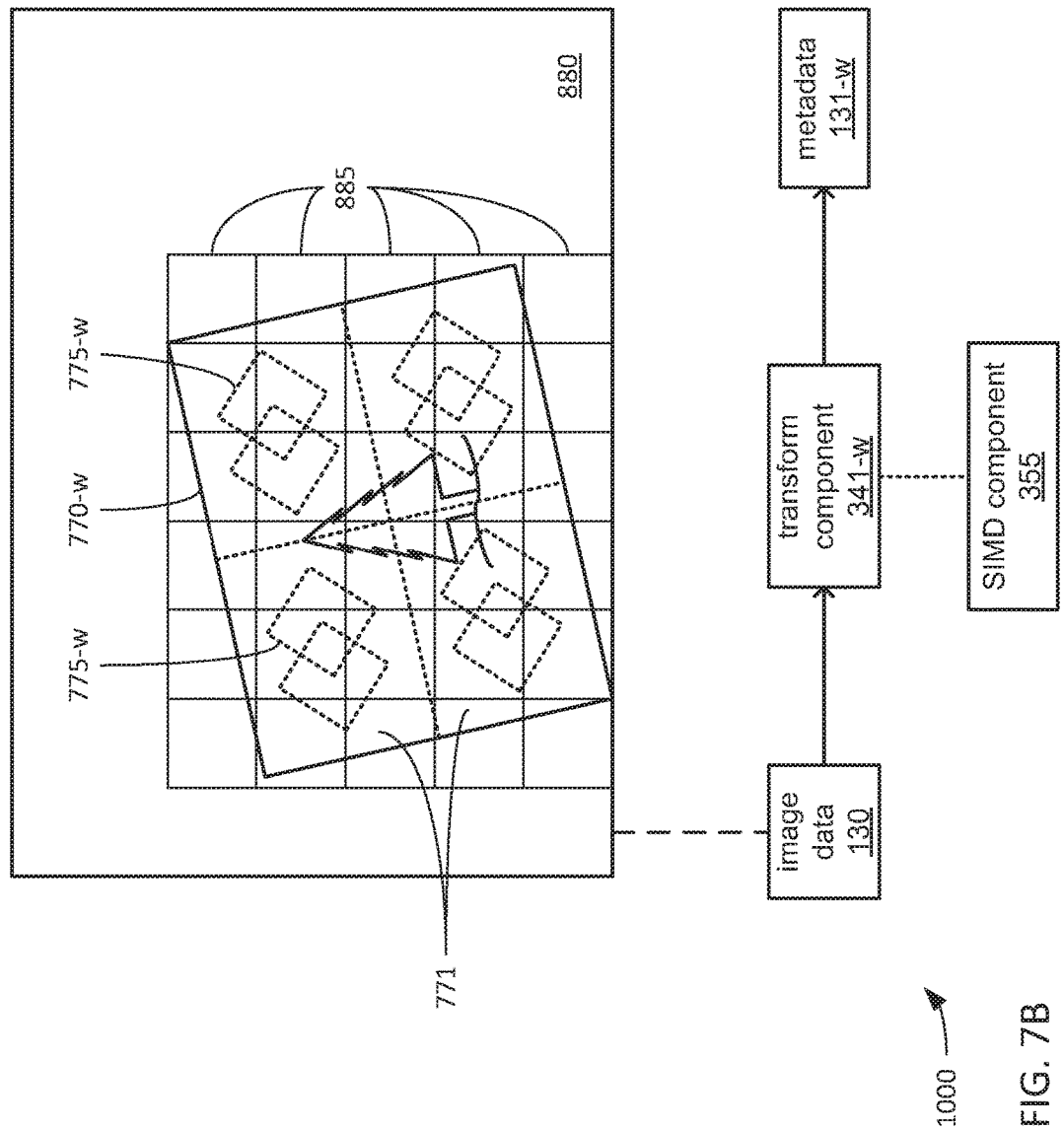
Figure 8A:
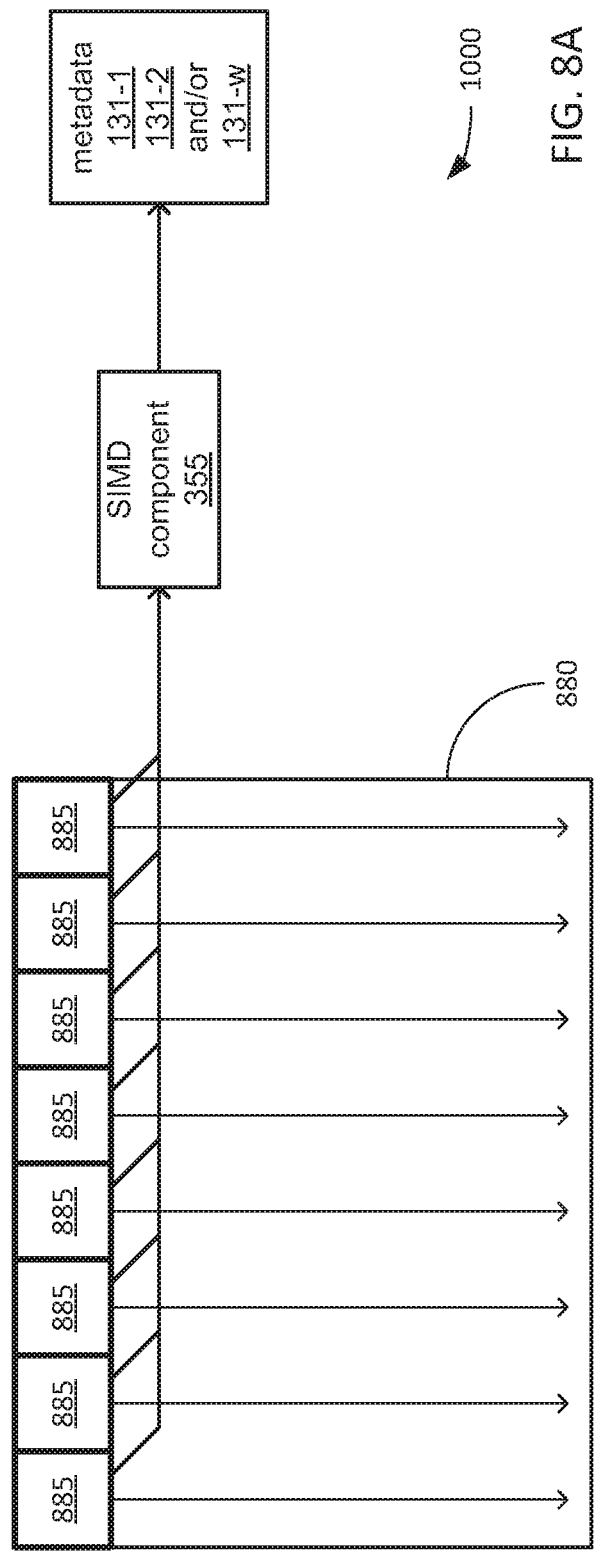
FIGS. 8A and 8B, together, show aspects of parallel performances of a transform to derive metadata of an image.
Figure 8B:
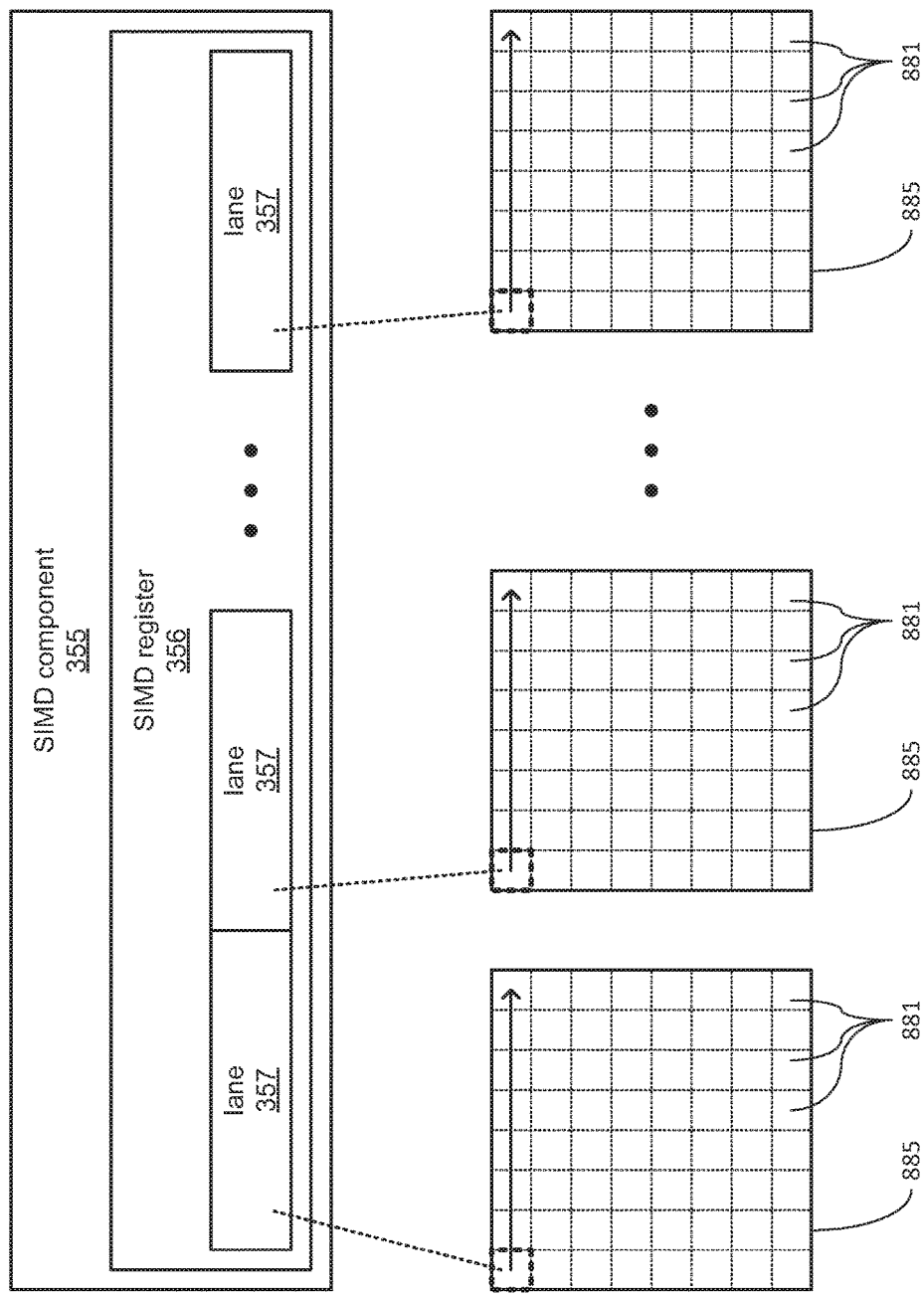

Turning to FIG. 7B, as previously discussed, the SIMD component 355 may execute instructions of the transform component 341-w, thereby causing the SIMD component 355 to perform one or more transforms to generate the metadata 131-*w* in preparation for subsequent processing to identify a ROI within the captured image 880 in which the digital watermark 775-*w* may be present. Again, the SIMD component 355 may be caused to divide the captured image 880 into multiple tiles 885 (of which only a few are shown for sake of clarity). For each one of the tiles 885, a separate portion of one or more SIMD registers of the SIMD component 355 may be used to perform a transform with the grayscale values retrieved from the image data 130 for each of the pixels 881 within each tile 885 to derive corresponding metadata data values for each tile 885 that may be stored as the metadata 131-*w*. FIGS. 8A and 8B, together, depict an example of such use of the SIMD component 355 to simultaneously perform an identical transform with all of the tiles 885 within a full row of tiles 885 extending horizontally across the captured image 880. More precisely, the side-by-side lanes 357 within each of one or more SIMD registers 356 of the SIMD component 355 may be employed to simultaneously convolve the performance of the same transform (e.g., using one of the forms of the stencil 886 of either FIGS. 5A-C or 6A-C) among the pixels 881 within each tile 885 within such a full row of tiles 885.

It should be note that, in embodiments in which the 1D indicia 775-1 and/or the 2D-indicia 775-2 are also to be decoded in addition to the digital watermark 775-*w*, the SIMD component 355 may divide the captured image 880 into the very same set of tiles 885 as part of performing transforms for each. This may be done in spite of the particular transforms that are performed in preparation for identifying ROI(s) associated with each of the 1D indicia 775-1, the 2D indicia 775-2 and the digital watermark 775-*w* being different transforms and/or different sets of transforms.

As previously discussed, the image sensor 110 may output a serial bitstream of grayscale values organized in horizontal raster scan order starting with the topmost horizontal row and proceeding downward to the bottommost horizontal row. In such embodiments, advantage may be taken of this ordering of grayscale values to perform the one or more transforms on whole horizontal rows of the tiles 885 at a time to generate the metadata 131-*w*, as the image sensor 110 provides grayscale values for a sufficient number of horizontal rows of pixels 881 to enable at least the commencement of performance of the one or more transforms with each successive horizontal row of tiles 885. More specifically, advantage may be taken of this ordering to utilize one or more SIMD registers 356 of the SIMD component 335 to perform the one or more transforms simultaneously within all of the tiles 885 within whole horizontal rows of the tiles 885, starting with the topmost row thereof.

Returning to FIG. 7B, as previously discussed, unlike the 1D indicia 775-1 or the 2D indicia 775-2, there may be multiple instances of the digital watermark 775-*w* arranged upon the label or portion 770-*w* of the object 700 in a tiled manner among multiple tiles 771. in some embodiments. In some embodiments, multiple transforms may be performed with the pixels 881 within each of the tiles 885 to generate the metadata 131-*w* as part of identifying a ROI in which at least one complete instance of the digital watermark 775-*w* may be present. In some embodiments, one or more S-transforms may be among the multiple transforms performed. Alternatively or additionally, among the multiple transforms performed may be one or more filters and/or spatial transforms to condition the grayscale values of the pixels 881 prior to the performance of other transform(s). In embodiments in which more than one of the 1D indicia 775-1, the 2D indicia 775-2 and the digital watermark 775-*w* are to be decoded, and in which one or more of the transforms associated with different ones of these are the same, the results of the performance of such one or more transforms may be used in the generation of more than one of the metadata 131-1, 131-2 and 131-*w* to avoid repeating a performance of a transform.

Figure 7C:
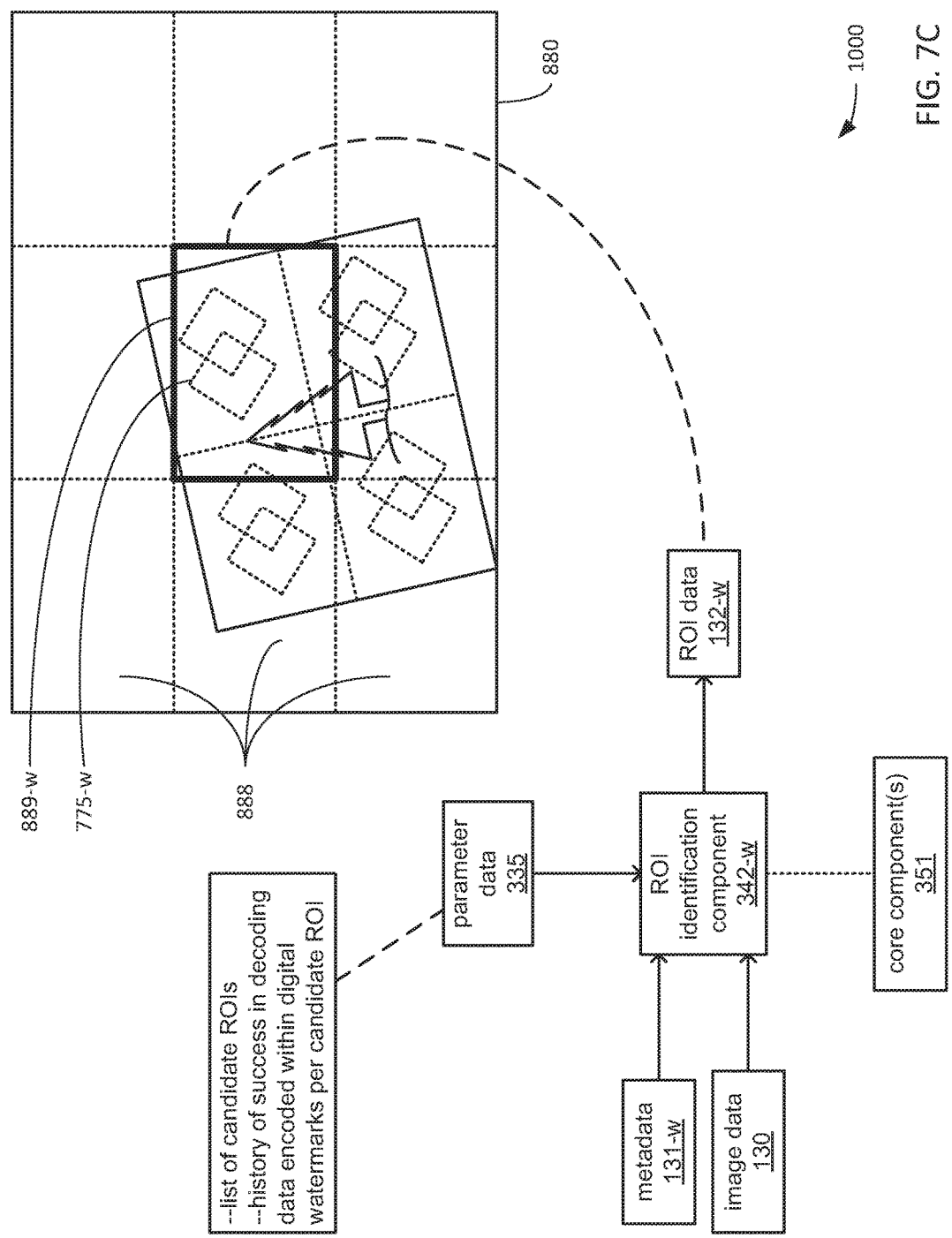

Turning more specifically to FIG. 7C, as previously discussed, one or more core components 351 of the processor 350 may be caused to execute instructions of the ROI identification component 342-*w* to perform an analysis of one or more metadata values within the metadata 131-*w* for each tile 885 as part of identifying one or more candidate ROIs 888 that may include at least one complete instance of the digital watermark 775-*w*. In some embodiments, the manner in which such ones of the candidate ROIs 888 may be identified may differ from the manner in which the earlier discussed ROI 889-1 or a corresponding ROI for the 2D indicia 775-2 may be identified. In such embodiments, the captured image 880 may be divided into a set of candidate ROIs 888 that may each be analyzed to first identify ones of the candidate ROIs 888 that may include a complete instance of the digital watermark 775-*w* as a result of including pixels 881 and/or tiles 885 that are indicated in the metadata 131-*w* as having characteristic(s) suggestive of there being at least a portion of the digital watermark 775-*w* therein.

Unfortunately, having such suggestive characteristics may only serve as an indication of a likelihood of a candidate ROI 888 including at least part of an instance of the digital watermark 775-*w*, and may be incapable of providing any indication of whether there is a complete instance of the digital watermark 775-*w* therein, or not. As will be familiar to those skilled in the art, successful digital watermark decoding to decode data that is encoded therein may require a complete instance of a digital watermark. Thus, confirmation of whether any of the candidate ROIs 888 actually includes a complete instance of the digital watermark 775-*w* therein may be possible only by subsequently attempting to perform a digital watermark decode therein. However, as will also be familiar to those skilled in the art, each such attempted performance of digital watermark decoding may consume considerable processing resources. Therefore, the performance of the analysis of each candidate ROI 888 to identify ones for such subsequent attempted digital watermark decoding may serve to reduce the quantity of the candidate ROIs 888 within which such subsequent digital watermark decoding is attempted, thereby reducing overall consumption of processing resources. Additionally, in embodiments in which the camera 100 is operated to capture a new image at a recurring interval, there may not be sufficient time available to attempt a digital watermarking decode within every candidate ROI 888, and therefore, such analysis to identify of ones of the candidate ROIs 888 that may include a complete instance of the digital watermark 775-*w* therein may serve to increase the likelihood of success in decoding such a complete instance within a limited amount of time before processing of the captured image 880 must cease to allow processing of the next captured image to begin.

It should be noted that, although the set of candidate ROIs 888 is depicted in FIG. 7C as resembling a tiled grid of identically sized candidate ROIs, other embodiments are possible in which the set of ROIs 888 may not be organized across the captured image 880 in such a manner. More specifically, in other embodiments, the candidate ROIs 888 may not be organized into a grid and/or at least some of the candidate ROIs 888 may overlap. Alternatively or additionally, the candidate ROIs 888 may not all be of the same shape and/or size (as measurable in pixels 881). By way of example, a set of candidate ROIs 888 may be defined in which there is a greater density of overlapping candidate ROIs 888 at the center of the captured image 880 than at the edges thereof. The sizing and/or location of each of the candidate ROIs 888 may be based on expectations of where a complete instance of the digital watermark 775-$w$ is expected to be within the captured image 880. Alternatively or additionally, such expectations may lead to the assignment of prioritization among the candidate ROIs 888 that may specify an order in which the candidate ROIs 888 may be analyzed to identify ROI(s) in which a complete instance of the digital watermark 775-$w$ may be present.

The parameter data 335 may include a list of the candidate ROIs 888, including definitions of the locations, shapes and/or sizes of each within the captured image 880. Again, in some embodiments, an ordering of the ROIs 888 within the list may be defined within the parameter data 335, and the one or more core components 351 may be caused to perform the analysis of the candidate ROIs 888 in the list in that order to identify one or more of the candidate ROIs 888 as being ROI(s) that may include a complete instance of the digital watermark 775-$w$. Alternatively, instead of following such a pre-defined ordering of the candidate ROIs 888, the one or more core components 351 may be caused to refer to a history stored in the parameter data 335 of which one or more of the candidate ROIs 888 have more frequently been confirmed to have a complete instance of digital watermark therein as a result of past successful digital watermark decodes therein for previously captured images. Thus, with each new captured image received from the camera 100, the one or more core components 351 may be caused to, at least initially, select the one of the candidate ROIs 888 that has a history of being the one of the candidate ROIs 888 within which a complete instance of a digital watermark has been successfully decoded most frequently. Stated differently, the one or more core components 351 may derive an order in which to analyze the candidate ROIs 888 based on such a history of relative rates of successful decoding.

Upon identifying one(s) of the candidate ROIs 888 that may include a complete instance of the digital watermark 775-$w$ therein, the one or more core components 351 may be caused by execution of the ROI identification component 342-$w$ to retrieve the grayscale values within the image data 130 for the pixels 881 of the portion(s) of the captured image 880 that correspond to each such identified ROI 889-$w$. The one or more core components 351 may then be caused to store those grayscale values of the pixels 881 of the one or more identified ROIs 889-$w$ within the ROI data 132-$w$.

Turning to FIG. 7D, as previously discussed, the SIMD component 355 may execute instructions of the rectification component 343-$w$, thereby causing the SIMD component 355 to perform rectification using homography with the portion of the captured image 880 that is within each of the identified ROIs 889-$w$ (as stored as the ROI data 132-$w$) to generate corresponding rectified images thereof. Such rectified ROIs may then be stored as the rectified data 133-$w$.

In some embodiments, a core component 351 of the processor 350 may be caused to make a determination of whether such rectification is to be performed. In some of such embodiments that include the sensor device 200, the core component 351 may be caused to operate the network interface 390 to receive an indication provided by the sensor device 200 of the degree of skew detected by the skew sensor 210 thereof. The core component 351 may compare the detected degree of skew to a skew threshold specified in the parameter data 335, and may determine whether rectification should be performed based on that comparison. Alternatively or additionally, and as previously discussed, the image sensor 110 and/or another component of the camera 100 may be capable of detecting the degree of skew in lieu of or in addition to the skew sensor 210 of the sensor device 200. In still others of such embodiments, the core component 351 may, over time, generate and maintain a history of the frequency with which digital watermarks have been successfully decoded at the location of each candidate ROI 888 without rectification having been performed in preparation for such decoding. It may be that such a history may be separately generated and maintained for each such location, and may include histories of rates of success and/or failure of decoding for each such location for both instances in which rectification was performed and in which rectification was not performed. The core component 351 may then determine whether rectification should be performed based on such history. In some embodiments, the determination of whether to perform such rectification may be made once for all identified ROIs 889-$w$ associated with the captured image 880. In other embodiments, the determination of whether to perform such rectification may be made individually for each identified ROI 889-$w$.

As will be familiar to those skilled in the art, the performance of rectification based on any of a wide variety of homography techniques (e.g., any of a variety of mathematical homography transforms) may consume considerable processing resources. Thus, it may be deemed desirable to avoid and/or limit the performances of rectification, where possible. Again, there may also be a time constraint in which there may be a limited period of time in which processing of the captured image 880 may need to be completed before processing of a next captured image must begin. Thus, each performance of rectification may consume processing resources that could have been used in the performance of other tasks associated with the captured image 880.

Continuing with FIG. 7D, as previously discussed, one or more core components 351 of the processor 350 may be caused to execute instructions of the watermark indicia decoding component 344-$w$ to perform digital watermark decoding in which an attempt is made to interpret a complete instance of the digital watermark 775-$w$ within each identified ROI 889-$w$ to decode the data that is encoded within the digital watermark 775-$w$. In interpreting the digital watermark 775-$w$ within the ROI 889-$w$ to decode the encoded data therefrom, the one or more core components 351 may employ various decoding parameters that may also be stored as part of the parameter data 335. Such decoding parameters may include one or more sets of rules by which a digital watermark that adheres to one or more standards for digital watermarks may be interpreted. If such decoding is successful, the resulting decoded data 134-$w$ may be stored in preparation for subsequent transmission. The one or more core components 351 may be caused to operate the network interface 390 to transmit the decoded data 134-$w$ to the another device via the network 999, such as the depicted server 900.

However, if such interpretation of the digital watermark 775-$w$ to decode the data encoded therein is not successful, then the assumption may be made that the identified ROI 889-$w$ within which the decode was attempted either does not include a complete instance of the digital watermark 775-$w$, or does not include any digital watermark despite the analysis of the metadata 131-$w$ being suggestive of there being a digital watermark therein. In response, one or more core components 351 may again execute the ROI identification component 342-*w* to attempt digital watermark decoding within another identified ROI 889-*w*, if there is another identified ROI 889-*w* within which digital watermark decoding can be attempted.

In some embodiments, attempts to perform digital watermark decoding may be made within each identified ROI 889-*w* until there is a successful decoding of the digital watermark 775-*w* within one of the identified ROIs 889-*w*, or until there are no more identified ROIs 889-*w* within which to attempt decoding, or until there remains insufficient time to perform digital watermark decoding attempt before processing of the captured image 880 must cease. As a result, there may be no successful decoding of the digital watermark 775-*w* from within the captured image 880, and this may occur despite multiple complete instances of the digital watermark 775-*w* being present within the captured image 880.

It should be noted that the analysis of each candidate ROI 888 to identify the one(s) that become the identified ROI(s) 889-*w* in which there may be a complete instance of the digital watermark 775-*w* (if any analysis is performed), the rectification of each identified ROI 889-*w* (if any rectification is performed), and the performance of digital watermark decoding with each identified ROI 889-*w* (whether rectified, or not) may be performed with varying degrees of parallelism in different embodiments. Such parallelism may be enabled by the availability of more than one of the core components 351 and/or more than one of the SIMD components 355. By way of example, the performance of rectification (if any) and of digital watermark decoding may occur immediately following the identification of a candidate ROI 888 as an identified ROI 889-*w*, even as analysis of the metadata 131-*w* continues to attempt to so identify more candidate ROIs 888. Alternatively or additionally, by way of another example, the performance of digital watermark decoding within one identified ROI 889-*w* may occur immediately following the performance of rectification thereon, even as rectification of another identified ROI 889-*w* is performed. As a result, in some embodiments, depending on available processing and/or resources, depending on whether one or more indicia are also to be decoded along with the digital watermark 775-*w*, depending on the quantity of candidate ROIs 888 and/or identified ROIs 889-*w*, and/or depending on the amount of time available, analysis of the metadata 131-*w* and/or performance(s) of rectification may be ongoing when either a complete instance of the digital watermark 775-*w* is decoded or when there ceases to be sufficient time available to perform another digital watermark decode within another identified ROI 889-*w*.

Figure 9A:
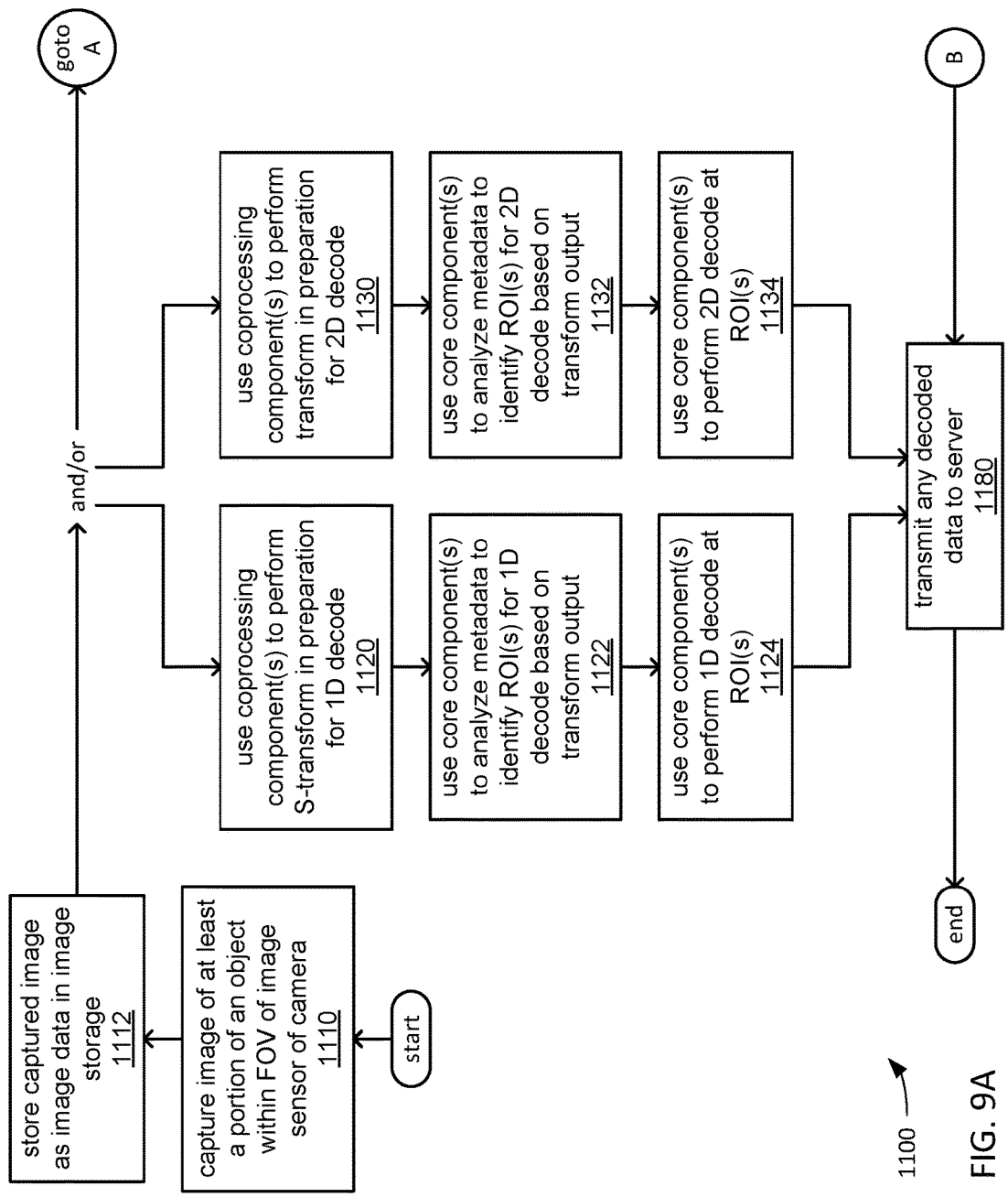

FIGS. 9A and 9B, together, provide a flowchart 1100 depicting aspects of operation of the decoding system 1000. More specifically, FIGS. 9A-B depict aspects of operations performed by the processor 350 of the decoding device 300 under the control of instructions of the control routine 340.

At 1110, an image sensor of a camera of a decoding system (e.g., the image sensor 110 of the camera 100 of the decoding system 1000) captures an image of at least a portion of an object within its FOV (e.g., the captured image 880 of at least a portion of the object 700 within the FOV 117). At 1112, a core component of a processor of a decoding device of the decoding system (e.g., a core component 351 of the processor 350 of the decoding device 300) may store the captured image within a storage of decoding device as image data (e.g., the image data 130 within the storage 360).

As has been discussed, in various embodiments, identification and decoding of differing ones of, or differing combinations of, a 1D indicia, a 2D indicia and a digital watermark may be performed. Thus, following the storage of the captured image at 1112, in differing embodiments, a SIMD component of the processor may perform one or more differing transforms associated with one or more of a 1D indicia, a 2D indicia and a digital watermark at one or more of 1120, 1130 and 1140, respectively. It should be noted that, in embodiments in which transforms of more than one of a 1D indicia, a 2D indicia and a digital watermark are performed at least partially in parallel, the performances of transforms at two or more of 1120, 1130 and/or 1140 may occur at least partially in parallel.

Turning to 1120, the SIMD component may be used to perform a Saporetti transform (S-transform) with grayscale values of pixels within each of multiple tiles into which the captured image may be divided (e.g., grayscale values of pixels 881 of the multiple tiles 885) to generate metadata in preparation for analysis to identify one or more ROIs in which a 1D indicia may be present (e.g., the metadata 131-1 associated with the 1D indicia 775-1). At 1122, at least one core component of the processor may be used to analyze the metadata associated with 1D indicia to identify one or more ROIs within which a 1D indicia may be present (e.g., one or more ROIs 889-1). At 1124, at least one core component of the processor may be used to perform a 1D decode of the 1D indicia within such a ROI to decode data encoded therein.

Turning to 1130, the SIMD component may be used to perform one or more transforms with grayscale values of pixels within each of the multiple tiles to generate metadata in preparation for analysis to identify one or more ROIs in which a 2D indicia may be present (e.g., the metadata 131-2 associated with the 2D indicia 775-2). At 1132, at least one core component of the processor may be used to analyze the metadata associated with 2D indicia to identify one or more ROIs within which a 2D indicia may be present. At 1324, at least one core component of the processor may be used to perform a 2D decode of the 2D indicia within such a ROI to decode data encoded therein.

Turning to 1140, at least one core component of the processor may make a determination of whether or not to perform an analysis of metadata (e.g., the metadata 131-*w*) to identify one or more ROIs of a set of candidate ROIs (e.g., the candidate ROIs 888) that may include a complete instance of a digital watermark for decoding (e.g., the digital watermark 775-*w*). As has been discussed, such other factors may include a predetermined selection of one or more candidate ROIs that are to be the identified ROIs within which the digital watermark decoding is to be attempted. Again, by way of example, it may be expected that a complete instance of the digital watermark will be present at one or more specific locations within the captured image such that the performance of such an analysis is deemed superfluous, and an indication of one or more ROIs that are to serve as the identified ROI(s) without the performance of an analysis to identify them may be stored as parameters for the at least one core component to retrieve. Alternatively or additionally, such other factors for identifying one or more of the candidate ROIs as identified ROIs that may each include a complete instance of the digital watermark may be a recorded history of rates of successful digital watermark decoding within the location of each of the candidate ROIs.

If, at 1140, the determination is made that such an analysis is not to be performed, then at 1142, the at least one core component may employ other factors to identify one or more ROIs of the set of candidate ROIs as identified ROIs (e.g., the one or more identified ROIs 889-*w*) that may each include a complete instance of the digital watermark.

However, if at 1140, a determination is made that such an analysis is to be performed, then at 1150, the SIMD component may be used to perform one or more transforms with grayscale values of pixels within each of the multiple tiles to generate metadata in preparation for such an analysis. At 1152, a core component of the processor may be used to analyze the metadata to identify one or more of the candidate ROIs of the set of candidate ROIs as being identified ROI(s) that may each include a complete instance of the digital watermark. As has been discussed, such an analysis may be performed in a manner that follows an specific order of the candidate ROIs. Again, such an order may be specified as a stored parameter to be retrieved by the one or more core components, or may be derived by the one or more core components based on an evaluation of a recorded history of rates of successful digital watermark decoding within the location of each of the candidate ROIs.

At 1160, following the identification of one or more ROIs at either 1142 or 1152, at least one core component of the processor may make a determination of whether or not to perform rectification of the portion of the captured image within each of one or more of the identified ROIs to reduce or eliminate the skew between the plane of the captured image and the plane of a surface of the object that carries the digital watermark (e.g., the label of portion 770-*w* of the object 700). As has been discussed, this determination may be based on an indication received from a skew sensor or other device or component (e.g., the skew sensor 210 of the sensor device 200) of the degree of skew between the plane of the captured image and the plane of that surface of the object. Alternatively, this determination may be based on a recorded history of rates of successful digital watermark decoding within the location of each of the candidate ROIs that are among the one or more identified ROIs.

If, at 1160, the determination is made that such rectification is not to be performed, then at 1162, at least one core component of the processor may be used to perform a digital watermark decode at the one or more identified ROIs to attempt to decode data encoded within the digital watermark. As has been discussed, it may be that confirmation of whether there is a complete instance of the digital watermark within any of the identified ROIs is possible only by attempting a performance of digital watermark decoding. Again, a performance of analysis of the metadata (if such an analysis is performed at 1152) may only be capable of determining that the grayscale values of a candidate ROI have characteristics consistent with at least a portion of the digital watermark being present therein, and may not be capable of providing an indication of whether the instance of the digital watermark that may be present therein is a complete instance. Therefore, the at least one core component may perform digital watermark decoding at each identified ROI until a successful decoding of a complete instance of the digital watermark occurs, or until there are no more identified ROIs at which to perform digital watermark decoding, or until insufficient time remains to perform another digital watermark decoding.

However, if at 1160, the determination is made that such rectification is to be performed, then at 1170, the SIMD component may be used to perform such rectification with at least a subset of one or more identified ROIs. At 1172, either following the performance(s) of rectification at 1170, or at least partially in parallel with the performance(s) of rectification at 1170, the at least one core component of the processor may be used to perform digital watermark decoding at each of the rectified ones of the identified ROI(s) to attempt to decode data encoded within the digital watermark. Again, the at least one core component may perform digital watermark decoding at each identified ROI until a successful decoding of a complete instance of the digital watermark occurs, or until there are no more identified ROIs at which to perform digital watermark decoding, or until insufficient time remains to perform rectification and/or digital watermark decoding with another identified ROI.

At 1180, a core component of the processor may operate a network interface of the decoding device (e.g., the network interface 390) to transmit any data that may be been successfully decoded at 1124, 1134, 1162 and/or 1172 to another device via a network (e.g., to the server 900 via the network 999).

There is thus disclosed a system to capture and decode encoded data. A decoding device may include a storage configured to store image data, and at least one of rectified watermark region of interest (ROI) data and watermark metadata, wherein: the image data includes grayscale values of pixels of an image captured by an image sensor of a camera of a portion of an object, the rectified watermark ROI data includes grayscale values of pixels of a rectified image of a watermark ROI within the captured image, and the watermark metadata may include a map of metadata values indicative of at least a watermark characteristic of the grayscale values of tiles of the pixels of the captured image. The decoding device may also include a processor coupled to the storage, and the processor may include a core component configured to: in response to generation of the watermark metadata, analyze the watermark metadata to identify the watermark ROI from among a set of candidate ROIs that each encompass a different portion of the captured image; determine whether rectification is to be performed with the grayscale values of the pixels within the watermark ROI to generate the rectified watermark ROI data; in response to performance of the rectification, perform watermark decoding with the rectified watermark ROI data to attempt a decode of watermark-encoded data encoded within a digital watermark within the rectified image of the watermark ROI; and in response to a successful decode of the watermark-encoded data, transmit the watermark-encoded data to a server via a network. The processor may also include a single-instruction multiple-data (SIMD) component configured to perform at least one of: a watermark transform with the grayscale values of the pixels of the captured image to generate the watermark metadata in preparation for the analysis of the watermark metadata by the core component; and the rectification with the grayscale values of the pixels within the watermark ROI to generate the rectified watermark ROI data in response to the determination by the core component to perform the rectification.

The core component may be configured to, in response to lack of performance of the rectification, perform watermark decoding with grayscale values of the image data associated with the watermark ROI to attempt a decode of the watermark-encoded data encoded within the digital watermark within the watermark ROI. The core component may be configured to identify the watermark ROI from among the set of candidate ROIs based on at least the watermark characteristic. The core component may be configured to: receive, from a sensor coupled to the processor, input indicative of a degree of skew of a surface of the object that is within a field of view (FOV) of the image sensor from a plane of the pixels of the captured image; and determine whether to perform the rectification based on the degree of skew. The core component may be configured to determine whether to perform rectification based on a degree of success in past interpretations of digital watermarks where rectification was not performed.

Each grayscale value consists of a value selected from the group consisting of: a level of intensity of a monochromatic pixel, wherein the captured image is a monochromatic image; a level of intensity of a color pixel, wherein the captured image is a color image and the grayscale value is accompanied by at least one chrominance value that specifies a color of the color pixel; and a level of intensity of a color component of a plurality of color components that cooperate to specify a color of a color pixel, wherein the captured image is a color image.

The storage may be configured to store indicia metadata that includes a map of metadata values indicative of at least an indicia characteristic of the grayscale values of tiles of the pixels of the captured image, and the SIMD component may be configured to perform an indicia transform with the grayscale values of the pixels of the captured image to generate the indicia metadata in preparation for analysis of the indicia metadata by the core component. The core component is configured to: analyze the indicia metadata to identify an indicia ROI within the captured image that includes an indicia that encodes a indicia-encoded data; and in response to identification of the indicia ROI within the captured image, perform indicia decoding with grayscale values of the image data associated with the indicia ROI to attempt a decode of the indicia-encoded data encoded within the indicia within the indicia ROI, and transmit the indicia-encoded data to a server via the network.

The indicia may include a two-dimensional (2D) indicia, and the 2D indicia may include a quick response (QR) code.

The indicia may include a one-dimensional (1D) bar code, and the indicia transform may include a Saporetti transform convolved among pixels of each tile of a plurality of tiles into which the indicia ROI is divided. The metadata values of the indicia metadata may include a metadata value selected from the set consisting of: a lowest grayscale value among a 2D array of pixels of a tile; a highest grayscale value among the 2D array of pixels of a tile; a value indicative of a contrast between grayscale values of adjacent pixels within the 2D array of pixels of a tile; and a quantity of parallel lines within the 2D array of pixels of a tile. The analysis of the indicia metadata may include a comparison of the metadata value to a threshold selected from the set consisting of: a minimum difference between the highest grayscale value and the lowest grayscale value; a minimum value for the contrast; and a minimum quantity of parallel lines within a tile of the plurality of tiles.

The identification of the indicia ROI may include an identification of a 2D array of tiles of the plurality of tiles that meets minimum dimensions and in which the metadata value for each tile within the 2D array of tiles meets the threshold.

A decoding system may include a camera that includes an image sensor configured to capture an image of a portion of an object, wherein the captured image is output by the camera as a bitstream of image data that may include grayscale values of pixels in a two-dimensional (2D) array of pixels of the captured image. The decoding system may also include a processor that includes a core component configured to: in response to generation of watermark metadata, analyze the watermark metadata to identify a watermark region of interest (ROI) within the captured image from among a set of candidate ROIs that each encompass a different portion of the captured image, wherein the watermark metadata may include a map of metadata values indicative of at least a watermark characteristic of the grayscale values of tiles of the pixels of the captured image; determine whether rectification is to be performed with the grayscale values of the pixels within the watermark ROI to generate a rectified watermark ROI data, wherein the rectified watermark ROI data may include grayscale values of pixels of a rectified image of the watermark ROI; in response to performance of the rectification, perform watermark decoding with the rectified watermark ROI data to attempt a decode of watermark-encoded data encoded within a digital watermark within the rectified image of the watermark ROI; and in response to a successful decode of the watermark-encoded data, transmit the watermark-encoded data to a server via a network. The processor may also include a single-instruction multiple-data (SIMD) component configured to perform at least one of: a watermark transform with the grayscale values of the pixels of the captured image to generate the watermark metadata in preparation for the analysis of the watermark metadata by the core component; and the rectification with the grayscale values of the pixels within the watermark ROI to generate the rectified watermark ROI data in response to the determination by the core component to perform the rectification.

The core component may be configured to, in response to lack of performance of the rectification, perform watermark decoding with grayscale values of the image data associated with the watermark ROI to attempt a decode of the watermark-encoded data encoded within the digital watermark within the watermark ROI. The core component may be configured to identify the watermark ROI from among the set of candidate ROIs based on at least the watermark characteristic.

The decoding system may include a sensor coupled to the processor to detect a degree of skew of a surface of the object that is within a field of view (FOV) of the image sensor from a plane of the pixels of the captured image, wherein the core component is configured to: receive, from the sensor, input indicative of the degree of skew; and determine whether to perform rectification based on the degree of skew. The sensor may include a laser scanner.

Each grayscale value consists of a value selected from the group consisting of: a level of intensity of a monochromatic pixel, wherein the captured image is a monochromatic image; a level of intensity of a color pixel, wherein the captured image is a color image and the grayscale value is accompanied by at least one chrominance value that specifies a color of the color pixel; and a level of intensity of a color component of a plurality of color components that cooperate to specify a color of a color pixel, wherein the captured image is a color image.

The SIMD component may be configured to perform an indicia transform with the grayscale values of the pixels of the captured image to generate an indicia metadata in preparation for analysis of the indicia metadata by the core component, wherein the indicia metadata may include a map of metadata values indicative of at least an indicia characteristic of the grayscale values of the pixels of the captured image. The core component may be configured to analyze the indicia metadata to identify an indicia ROI within the captured image that includes an indicia that encodes a indicia-encoded data; and in response to identification of the indicia ROI within the captured image, perform indicia decoding with grayscale values of the image data associated with the indicia ROI to attempt a decode of the indicia-encoded data encoded within the indicia within the indicia ROI, and transmit the indicia-encoded data to a server via the network.

The indicia may include a one-dimensional (1D) bar code, and the indicia transform may include a Saporetti transform convolved among pixels of each tile of a plurality of tiles into which the indicia ROI is divided. The metadata values of the indicia metadata may include a metadata value selected from the set consisting of: a lowest grayscale value among a 2D array of pixels of a tile; a highest grayscale value among the 2D array of pixels of a tile; a value indicative of a contrast between grayscale values of adjacent pixels within the 2D array of pixels of a tile; and a quantity of parallel lines within the 2D array of pixels of a tile. The analysis of the indicia metadata may include a comparison of the metadata value to a threshold selected from the set consisting of: a minimum difference between the highest grayscale value and the lowest grayscale value; a minimum value for the contrast; and a minimum quantity of parallel lines within a tile of the plurality of tiles.

A decoding device may include a storage configured to store image data and indicia metadata, wherein: the image data may include grayscale values of pixels of an image captured by an image sensor of a camera of a portion of an object; the captured image is divided into a plurality of tiles; each tile of the plurality of tiles may include a two-dimensional (2D) array of pixels of a portion of the captured image; and the indicia metadata may include a map of metadata values indicative of at least an indicia characteristic of the grayscale values of the pixels within each tile. The decoding device may also include a processor coupled to the storage, and the processor may include a core component configured to: analyze the indicia metadata to identify an indicia ROI within the captured image that includes an indicia that encodes a indicia-encoded data; and in response to identification of the indicia ROI within the captured image, interpret the indicia to decode the indicia-encoded data, and transmit the indicia-encoded data to a server via a network. The processor may also include a single-instruction multiple-data (SIMD) component configured to perform an indicia transform with the grayscale values of the pixels of the captured image to generate the indicia metadata in preparation for the analysis of the indicia metadata by the core component.

The indicia may include a two-dimensional (2D) indicia, and the 2D indicia may include a quick response (QR) code.

The indicia may include a one-dimensional (1D) bar code, and the indicia transform may include a Saporetti transform convolved among pixels of each tile of the plurality of tiles. The metadata values of the indicia metadata may include a metadata value selected from the set consisting of: a lowest grayscale value among a 2D array of pixels of a tile; a highest grayscale value among the 2D array of pixels of a tile; a value indicative of a contrast between grayscale values of adjacent pixels within the 2D array of pixels of a tile; and a quantity of parallel lines within the 2D array of pixels of a tile. The analysis of the indicia metadata may include a comparison of the metadata value to a threshold selected from the set consisting of: a minimum difference between the highest grayscale value and the lowest grayscale value; a minimum value for the contrast; and a minimum quantity of parallel lines within a tile of the plurality of tiles. The identification of the indicia ROI may include an identification of a 2D array of tiles of the plurality of tiles that meets minimum dimensions and in which the metadata value for each tile within the 2D array of tiles meets the threshold.

The storage may be configured to store at least one of rectified watermark ROI data and watermark metadata, wherein: the rectified watermark ROI data may include grayscale values of pixels of a rectified image of a watermark ROI within the captured image; and the watermark metadata may include a map of metadata values indicative of at least a watermark characteristic of the grayscale values of tiles of the pixels of the captured image. The core component may be configured to: in response to generation of the watermark metadata, analyze the watermark metadata to identify the watermark ROI from among a set of candidate ROIs that each encompass a different portion of the captured image; determine whether rectification is to be performed with the grayscale values of the pixels within the watermark ROI to generate the rectified watermark ROI data; in response to performance of the rectification, perform watermark decoding with the rectified watermark ROI data to attempt a decode of watermark-encoded data encoded within a digital watermark within the rectified image of the watermark ROI; and in response to a successful decode of the watermark-encoded data, transmit the watermark-encoded data to a server via a network. The SIMD component may be configured to perform at least one of: a watermark transform with the grayscale values of the pixels of the captured image to generate the watermark metadata in preparation for the analysis of the watermark metadata by the core component; and the rectification with the grayscale values of the pixels within the watermark ROI to generate the rectified watermark ROI data in response to the determination by the core component to perform the rectification.

The core component may be configured to, in response to lack of performance of the rectification, perform watermark decoding with grayscale values of the image data associated with the watermark ROI to attempt a decode of the watermark-encoded data encoded within the digital watermark within the watermark ROI.

Various other components may be included and called upon for providing for aspects of the teachings herein. For example, additional materials, combinations of materials, and/or omission of materials may be used to provide for added embodiments that are within the scope of the teachings herein.

Standards for performance, selection of materials, functionality, and other discretionary aspects are to be determined by a user, designer, manufacturer, or other similarly interested party. Any standards expressed herein are merely illustrative and are not limiting of the teachings herein.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

While the invention has been described with reference to illustrative embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A decoding device comprising:
  storage configured to store image data, and at least one of a rectified watermark region of interest (ROI) data and watermark metadata, wherein:
    the image data comprises grayscale values of pixels of an image captured by an image sensor of a camera of a portion of an object;
    the rectified watermark ROI data comprises grayscale values of pixels of a rectified image of a watermark ROI within the captured image; and
    the watermark metadata comprises a map of metadata values indicative of at least a watermark characteristic of the grayscale values of tiles of the pixels of the captured image; and
  a processor coupled to the storage, the processor comprising:
    a core component configured to:
      in response to generation of the watermark metadata, analyze the watermark metadata to identify the watermark ROI from among a set of candidate ROIs that each encompass a different portion of the captured image;
      determine whether rectification is to be performed with the grayscale values of the pixels within the watermark ROI to generate the rectified watermark ROI data;
      in response to performance of the rectification, perform watermark decoding with the rectified watermark ROI data to attempt a decode of watermark-encoded data encoded within a digital watermark within the rectified image of the watermark ROI; and
      in response to a successful decode of the watermark-encoded data, transmit the watermark-encoded data to a server via a network; and
    a single-instruction multiple-data (SIMD) component configured to perform at least one of:
      a watermark transform with the grayscale values of the pixels of the captured image to generate the watermark metadata in preparation for the analysis of the watermark metadata by the core component; and
      the rectification with the grayscale values of the pixels within the watermark ROI to generate the rectified watermark ROI data in response to the determination by the core component to perform the rectification.

2. The decoding device of claim 1, wherein the core component is configured to, in response to lack of performance of the rectification, perform watermark decoding with grayscale values of the image data associated with the watermark ROI to attempt a decode of the watermark-encoded data encoded within the digital watermark within the watermark ROI.

3. The decoding device of claim 1, wherein the core component is configured to identify the watermark ROI from among the set of candidate ROIs based on at least the watermark characteristic.

4. The decoding device of claim 1, wherein the core component is configured to:
  receive, from a sensor coupled to the processor, input indicative of a degree of skew of a surface of the object that is within a field of view (FOV) of the image sensor from a plane of the pixels of the captured image; and
  determine whether to perform the rectification based on the degree of skew.

5. The decoding device of claim 1, wherein the core component is configured to determine whether to perform rectification based on a degree of success in past interpretations of digital watermarks where rectification was not performed.

6. The decoding device of claim 1, wherein each grayscale value consists of a value selected from the group consisting of:
  a level of intensity of a monochromatic pixel, wherein the captured image is a monochromatic image;
  a level of intensity of a color pixel, wherein the captured image is a color image and the grayscale value is accompanied by at least one chrominance value that specifies a color of the color pixel; and
  a level of intensity of a color component of a plurality of color components that cooperate to specify a color of a color pixel, wherein the captured image is a color image.

7. The decoding device of claim 1, wherein:
  the storage is configured to store indicia metadata comprising a map of metadata values indicative of at least an indicia characteristic of the grayscale values of tiles of the pixels of the captured image;
  the SIMD component is configured to perform an indicia transform with the grayscale values of the pixels of the captured image to generate the indicia metadata in preparation for analysis of the indicia metadata by the core component; and
  the core component is configured to:
    analyze the indicia metadata to identify an indicia ROI within the captured image that includes an indicia that encodes a indicia-encoded data; and
    in response to identification of the indicia ROI within the captured image, perform indicia decoding with grayscale values of the image data associated with the indicia ROI to attempt a decode of the indicia-encoded data encoded within the indicia within the indicia ROI, and transmit the indicia-encoded data to a server via the network.

8. The decoding device of claim 7, wherein the indicia comprises a two-dimensional (2D) indicia.

9. The decoding device of claim 8, wherein the 2D indicia comprises a quick response (QR) code.

10. The decoding device of claim 7, wherein the indicia comprises a one-dimensional (1D) bar code.

11. The decoding device of claim 10, wherein:
  the indicia transform comprises a Saporetti transform convolved among pixels of each tile of a plurality of tiles into which the indicia ROI is divided;
  the metadata values of the indicia metadata comprise a metadata value selected from the set consisting of:
    a lowest grayscale value among a 2D array of pixels of a tile;
    a highest grayscale value among the 2D array of pixels of a tile;
    a value indicative of a contrast between grayscale values of adjacent pixels within the 2D array of pixels of a tile; and
    a quantity of parallel lines within the 2D array of pixels of a tile; and
  the analysis of the indicia metadata comprises a comparison of the metadata value to a threshold selected from the set consisting of:
    a minimum difference between the highest grayscale value and the lowest grayscale value;
    a minimum value for the contrast; and a minimum quantity of parallel lines within a tile of the plurality of tiles.

12. The decoding device of claim 11, wherein the identification of the indicia ROI comprises an identification of a 2D array of tiles of the plurality of tiles that meets minimum dimensions and in which the metadata value for each tile within the 2D array of tiles meets the threshold.

13. A decoding system comprising:
a camera that comprises an image sensor configured to capture an image of a portion of an object, wherein the captured image is output by the camera as a bitstream of image data comprising grayscale values of pixels in a two-dimensional (2D) array of pixels of the captured image; and
a processor comprising:
a core component configured to:
in response to generation of watermark metadata, analyze the watermark metadata to identify a watermark region of interest (ROI) within the captured image from among a set of candidate ROIs that each encompass a different portion of the captured image, wherein the watermark metadata comprises a map of metadata values indicative of at least a watermark characteristic of the grayscale values of tiles of the pixels of the captured image;
determine whether rectification is to be performed with the grayscale values of the pixels within the watermark ROI to generate a rectified watermark ROI data, wherein the rectified watermark ROI data comprises grayscale values of pixels of a rectified image of the watermark ROI;
in response to performance of the rectification, perform watermark decoding with the rectified watermark ROI data to attempt a decode of watermark-encoded data encoded within a digital watermark within the rectified image of the watermark ROI; and
in response to a successful decode of the watermark-encoded data, transmit the watermark-encoded data to a server via a network; and
a single-instruction multiple-data (SIMD) component configured to perform at least one of:
a watermark transform with the grayscale values of the pixels of the captured image to generate the watermark metadata in preparation for the analysis of the watermark metadata by the core component; and
the rectification with the grayscale values of the pixels within the watermark ROI to generate the rectified watermark ROI data in response to the determination by the core component to perform the rectification.

14. The decoding system of claim 13, wherein the core component is configured to, in response to lack of performance of the rectification, perform watermark decoding with grayscale values of the image data associated with the watermark ROI to attempt a decode of the watermark-encoded data encoded within the digital watermark within the watermark ROI.

15. The decoding system of claim 13, wherein the core component is configured to identify the watermark ROI from among the set of candidate ROIs based on at least the watermark characteristic.

16. The decoding system of claim 13, comprising a sensor coupled to the processor to detect a degree of skew of a surface of the object that is within a field of view (FOV) of the image sensor from a plane of the pixels of the captured image, wherein the core component is configured to:
receive, from the sensor, input indicative of the degree of skew; and
determine whether to perform rectification based on the degree of skew.

17. The decoding system of claim 16, wherein the sensor comprises a laser scanner.

18. The decoding system of claim 13, wherein each grayscale value consists of a value selected from the group consisting of:
a level of intensity of a monochromatic pixel, wherein the captured image is a monochromatic image;
a level of intensity of a color pixel, wherein the captured image is a color image and the grayscale value is accompanied by at least one chrominance value that specifies a color of the color pixel; and
a level of intensity of a color component of a plurality of color components that cooperate to specify a color of a color pixel, wherein the captured image is a color image.

19. The decoding system of claim 13, wherein:
the SIMD component is configured to perform an indicia transform with the grayscale values of the pixels of the captured image to generate an indicia metadata in preparation for analysis of the indicia metadata by the core component, wherein the indicia metadata comprises a map of metadata values indicative of at least an indicia characteristic of the grayscale values of the pixels of the captured image; and
the core component is configured to:
analyze the indicia metadata to identify an indicia ROI within the captured image that includes an indicia that encodes a indicia-encoded data; and
in response to identification of the indicia ROI within the captured image, perform indicia decoding with grayscale values of the image data associated with the indicia ROI to attempt a decode of the indicia-encoded data encoded within the indicia within the indicia ROI, and transmit the indicia-encoded data to a server via the network.

20. The decoding system of claim 19, wherein the indicia comprises a one-dimensional (1D) bar code.

21. The decoding system of claim 20, wherein:
the indicia transform comprises a Saporetti transform convolved among pixels of each tile of a plurality of tiles into which the indicia ROI is divided;
the metadata values of the indicia metadata comprise a metadata value selected from the set consisting of:
a lowest grayscale value among a 2D array of pixels of a tile;
a highest grayscale value among the 2D array of pixels of a tile;
a value indicative of a contrast between grayscale values of adjacent pixels within the 2D array of pixels of a tile; and
a quantity of parallel lines within the 2D array of pixels of a tile; and
the analysis of the indicia metadata comprises a comparison of the metadata value to a threshold selected from the set consisting of:
a minimum difference between the highest grayscale value and the lowest grayscale value;
a minimum value for the contrast; and
a minimum quantity of parallel lines within a tile of the plurality of tiles.

22. A decoding device comprising:
storage configured to store image data and indicia metadata, wherein:
the image data comprises grayscale values of pixels of an image captured by an image sensor of a camera of a portion of an object;
the captured image is divided into a plurality of tiles;
each tile of the plurality of tiles comprises a two-dimensional (2D) array of pixels of a portion of the captured image; and
the indicia metadata comprises a map of metadata values indicative of at least an indicia characteristic of the grayscale values of the pixels within each tile; and
a processor coupled to the storage, the processor comprising:
a core component configured to:
analyze the indicia metadata to identify an indicia ROI within the captured image that includes an indicia that encodes a indicia-encoded data; and
in response to identification of the indicia ROI within the captured image, interpret the indicia to decode the indicia-encoded data, and transmit the indicia-encoded data to a server via a network; and
a single-instruction multiple-data (SIMD) component configured to perform an indicia transform with the grayscale values of the pixels of the captured image to generate the indicia metadata in preparation for the analysis of the indicia metadata by the core component.

23. The decoding device of claim 22, wherein the indicia comprises a two-dimensional (2D) indicia.

24. The decoding device of claim 23, wherein the 2D indicia comprises a quick response (QR) code.

25. The decoding device of claim 22, wherein the indicia comprises a one-dimensional (1D) bar code.

26. The decoding device of claim 25, wherein:
the indicia transform comprises a Saporetti transform convolved among pixels of each tile of the plurality of tiles;
the metadata values of the indicia metadata comprise a metadata value selected from the set consisting of:
a lowest grayscale value among a 2D array of pixels of a tile;
a highest grayscale value among the 2D array of pixels of a tile;
a value indicative of a contrast between grayscale values of adjacent pixels within the 2D array of pixels of a tile; and
a quantity of parallel lines within the 2D array of pixels of a tile; and
the analysis of the indicia metadata comprises a comparison of the metadata value to a threshold selected from the set consisting of:
a minimum difference between the highest grayscale value and the lowest grayscale value;
a minimum value for the contrast; and
a minimum quantity of parallel lines within a tile of the plurality of tiles.

27. The decoding device of claim 26, wherein the identification of the indicia ROI comprises an identification of a 2D array of tiles of the plurality of tiles that meets minimum dimensions and in which the metadata value for each tile within the 2D array of tiles meets the threshold.

28. The decoding device of claim 22, wherein:
the storage is configured to store at least one of rectified watermark ROI data and watermark metadata, wherein:
the rectified watermark ROI data comprises grayscale values of pixels of a rectified image of a watermark ROI within the captured image; and
the watermark metadata comprises a map of metadata values indicative of at least a watermark characteristic of the grayscale values of tiles of the pixels of the captured image;
the core component is configured to:
in response to generation of the watermark metadata, analyze the watermark metadata to identify the watermark ROI from among a set of candidate ROIs that each encompass a different portion of the captured image;
determine whether rectification is to be performed with the grayscale values of the pixels within the watermark ROI to generate the rectified watermark ROI data;
in response to performance of the rectification, perform watermark decoding with the rectified watermark ROI data to attempt a decode of watermark-encoded data encoded within a digital watermark within the rectified image of the watermark ROI; and
in response to a successful decode of the watermark-encoded data, transmit the watermark-encoded data to a server via a network; and
the SIMD component is configured to perform at least one of:
a watermark transform with the grayscale values of the pixels of the captured image to generate the watermark metadata in preparation for the analysis of the watermark metadata by the core component; and
the rectification with the grayscale values of the pixels within the watermark ROI to generate the rectified watermark ROI data in response to the determination by the core component to perform the rectification.

29. The decoding device of claim 28, wherein the core component is configured to, in response to lack of performance of the rectification, perform watermark decoding with grayscale values of the image data associated with the watermark ROI to attempt a decode of the watermark-encoded data encoded within the digital watermark within the watermark ROI.

* * * * *